United States Patent
Seshan et al.

(10) Patent No.: US 11,818,022 B2
(45) Date of Patent: Nov. 14, 2023

(54) METHODS AND SYSTEMS FOR CLASSIFYING TRAFFIC FLOWS BASED ON PACKET PROCESSING METADATA

(71) Applicant: Pensando Systems Inc., Milpitas, CA (US)

(72) Inventors: Lakshmi Narasimhan Seshan, San Jose, CA (US); Bharat Kumar Bandaru, Pleasanton, CA (US)

(73) Assignee: PENSANDO SYSTEMS INC., Milpitas, CA (US)

( * ) Notice: Subject to any disclaimer, the term of this patent is extended or adjusted under 35 U.S.C. 154(b) by 132 days.

(21) Appl. No.: 16/917,391

(22) Filed: Jun. 30, 2020

(65) Prior Publication Data

US 2021/0409316 A1 Dec. 30, 2021

(51) Int. Cl.
| | |
|---|---|
| *H04L 43/026* | (2022.01) |
| *H04L 45/00* | (2022.01) |
| *H04L 45/42* | (2022.01) |
| *H04L 43/16* | (2022.01) |
| *H04L 45/30* | (2022.01) |
| *G06F 18/214* | (2023.01) |
| *G06F 18/2413* | (2023.01) |

(52) U.S. Cl.
CPC .......... *H04L 43/026* (2013.01); *G06F 18/214* (2023.01); *G06F 18/2413* (2023.01); *H04L 43/16* (2013.01); *H04L 45/30* (2013.01); *H04L 45/38* (2013.01); *H04L 45/42* (2013.01)

(58) Field of Classification Search
CPC ....................................................... H04L 45/38
See application file for complete search history.

(56) References Cited

U.S. PATENT DOCUMENTS

| | | | |
|---|---|---|---|
| 10,873,533 B1 | 12/2020 | Ismailsheriff et al. | |
| 2015/0071072 A1* | 3/2015 | Ratzin | G06F 9/544 |
| | | | 370/235 |
| 2015/0195767 A1 | 7/2015 | Trang et al. | |
| 2016/0105364 A1* | 4/2016 | Kanonakis | H04L 47/10 |
| | | | 370/235 |
| 2018/0131620 A1 | 5/2018 | Su et al. | |
| 2018/0152386 A1 | 5/2018 | Chen et al. | |
| 2019/0312815 A1* | 10/2019 | Altman | H04L 43/0876 |
| 2020/0169509 A1 | 5/2020 | Tigli | |
| 2020/0382421 A1 | 12/2020 | K et al. | |

(Continued)

OTHER PUBLICATIONS

Arnold, Michael, "Predictive Networking and Optimization for Flow-Based Networks.", A Thesis, 2017, 65 pgs.

(Continued)

*Primary Examiner* — Ivan O Latorre
*Assistant Examiner* — Won Tae C Kim
(74) *Attorney, Agent, or Firm* — LOZA & LOZA LLP

(57) ABSTRACT

Methods and system for directing traffic flows to a fast data path or a slow data path are disclosed. Parsers can produce packet header vectors (PHVs) for use in match-action units. The PHVs are also used to generate feature vectors for the traffic flows. A flow training engine produces a classification model. Feature vectors input to the classification model result in output predictions predicting if a traffic flow will be long lived or short lived. The classification models are used by network appliances to install traffic flows into fast data paths or the slow data paths based on the predictions.

18 Claims, 14 Drawing Sheets

(56) References Cited

U.S. PATENT DOCUMENTS

2020/0396169 A1* 12/2020 Tan .................... H04L 47/2433
2021/0336883 A1* 10/2021 Pudiyapura ........... H04L 45/745
2021/0377188 A1* 12/2021 Ghag ................... H04L 49/508
2021/0409487 A1* 12/2021 Pi ........................... H04L 69/08

OTHER PUBLICATIONS

Avrachenkov, Konstantin et al. "Differentiation Between Short and Long TCP Flows: Predictability of the Response Time", 2004, 12 pgs.
McGregor, Anthony et al. "Flow Clustering Using Machine Learning Techniques", 2004, 10 pgs.
Ebrahimi-Taghizadeh, Shirin et al. "TCP vs. TCP: a Systematic Study of Adverse Impact of Short-lived TCP Flows on Long-lived TCP Flows", 2005 IEEE, 12 pgs.
Non-Final Office Action, U.S. Appl. No. 16/917,412; 20 pages (dated Jan. 18, 2022).

* cited by examiner

METHODS AND SYSTEMS FOR CLASSIFYING TRAFFIC FLOWS BASED ON PACKET PROCESSING METADATA

TECHNICAL FIELD

The embodiments relate to computer networks, network appliances, network switches, network routers, machine learning, artificial intelligence, using machine learning to classify traffic flows, and to using machine learning to improve hardware resource utilization by network appliances.

BACKGROUND

In data networks, network appliances such as switches, routers, and network interface cards receive packets at input interfaces, process the received packets, and then forward the packets to one or more output interfaces. It is important that such network appliances operate as quickly as possible in order to keep pace with a high rate of incoming packets. One challenge associated with network appliances relates to providing the flexibility to adapt to changes in desired feature sets, networking protocols, operating systems, applications, and hardware configurations.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

One aspect of the subject matter described in this disclosure can be implemented in a method. The method includes receiving a plurality of traffic flows at an ingress unit of a network appliance, generating a plurality of packet header vectors by parsing a packet of each of the plurality of traffic flows, and generating a plurality of feature vectors using the plurality of packet header vectors. The method can also include associating a plurality of labels with the plurality of feature vectors, each of the plurality of feature vectors labeled with one of the plurality of labels, each of the plurality of labels indicating one of a plurality of classes, and the plurality of classes including long lived flow and short lived flow. The method can further include producing a training data that includes the plurality of feature vectors and the plurality of labels, and producing a classification model using the training data, wherein the classification model is configured to produce a prediction based on an input feature vector, the prediction indicating one of the plurality of classes.

Another aspect of the subject matter described in this disclosure can be implemented in a network appliance. The network appliance includes an ingress unit, a fast data path, and a slow data path. The network appliance can be configured to receive a plurality of traffic flows at the ingress unit, to generate a plurality of packet header vectors by parsing a packet of each of the plurality of traffic flows, and to generate a plurality of feature vectors using the plurality of packet header vectors. The network appliance can also be configured to associate a plurality of labels with the plurality of feature vectors, each of the plurality of feature vectors labeled with one of the plurality of labels, each of the plurality of labels indicating one of a plurality of classes, and the plurality of classes including long lived flow and short lived flow. In addition, the network appliance can be configured to produce a training data that includes the plurality of feature vectors and the plurality of labels, and to submit the training data to a flow training engine configured to produce a classification model using the training data, wherein the classification model is configured to produce a prediction based on an input feature vector, the prediction indicating one of the plurality of classes.

Another aspect of the subject matter described in this disclosure can be implemented in a network appliance. The network appliance includes a means for receiving a plurality of traffic flows at an ingress unit, a means for generating a plurality of feature vectors, and a means for labeling each of the plurality of feature vectors as one of a plurality of classes, and the plurality of classes including long lived flow and short lived flow. The network appliance can also include a means for producing a training data that includes the plurality of feature vectors and the means for labeling each of the plurality of feature vectors, and a means for submitting the training data to a flow training engine configured to produce a classification model based on the training data, wherein the classification model is configured to receive a feature vector and to output a prediction indicating one of the plurality of classes.

In some implementations of the methods and devices, producing the classification model can include initializing the classification model, training the classification model by iteratively inputting the plurality of feature vectors to obtain a plurality of predictions, and modifying the classification model based on the plurality of predictions and the plurality of labels to cause the classification model to decrease an error rate.

In some implementations of the methods and devices, the network appliance includes a fast data path that includes a parser, a match action pipeline, and a deparser, the match action pipeline including a plurality of match action units. In some implementations of the methods and devices a special purpose packet processing circuitry can be configured to implement the match action pipeline. In some implementations of the methods and devices a network interface card includes the special purpose packet processing circuitry and a slow data path.

In some implementations of the methods and devices, the training data further includes a plurality of additional feature vectors associated with a plurality of additional labels received from a plurality of additional network appliances.

In some implementations of the methods and devices, a plurality of network appliances includes the network appliance and the plurality of additional network appliances, each of the plurality of network appliances configured with a special purpose packet processing circuitry configured to implement a data path of each of the plurality of network appliances.

In some implementations of the methods and devices, the classification model is a neural network having at least two hidden layers. In some implementations of the methods and device, special purpose packet processing circuitry configured as a data path generates at least one of the plurality of packet header vectors. In some implementations of the methods and devices, assigning the plurality of labels is based on a plurality of traffic flow durations of the plurality of traffic flows.

In some implementations of the methods and devices, associating the plurality of labels with the plurality of feature vectors includes initially labeling each of the plurality of traffic flows as short lived flow, and relabeling each of the plurality of traffic flows that exceeds a threshold duration as long lived flow.

In some implementations of the methods and devices, the network appliance is configured to store the plurality of feature vectors and the plurality of labels as a plurality of training batches, and transmit the plurality of training batches to a flow training engine configured to produce the classification model.

In some implementations of the methods and devices, the network appliance includes a fast data path, a slow data path, and a flow predictor, the network appliance configured to install the classification model in the flow predictor, produce a plurality of predictions by inputting the plurality of feature vectors into the flow predictor, and direct the plurality of traffic flows along the fast data path or the slow data path based on the plurality of predictions.

In some implementations of the methods and devices, the network appliance includes the flow training engine, the flow training engine configured to initialize the classification model, train the classification model by iteratively inputting the plurality of feature vectors to obtain a plurality of predictions, and modify the classification model based on the plurality of predictions and the plurality of labels to cause the classification model to decrease an error rate.

In some implementations of the methods and devices, a special purpose packet processing circuitry is configured to implement the fast data path, the fast data path including a parser, a match action pipeline, and a deparser, and the match action pipeline including a plurality of match action units.

In some implementations of the methods and devices, the network appliance is further configured to label the plurality of feature vectors based on a plurality of flow durations.

These and other aspects will become more fully understood upon a review of the detailed description, which follows. Other aspects, features, and embodiments will become apparent to those of ordinary skill in the art, upon reviewing the following description of specific, exemplary embodiments of in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

Throughout the description, similar reference numbers may be used to identify similar elements.

DETAILED DESCRIPTION

Figure 1:
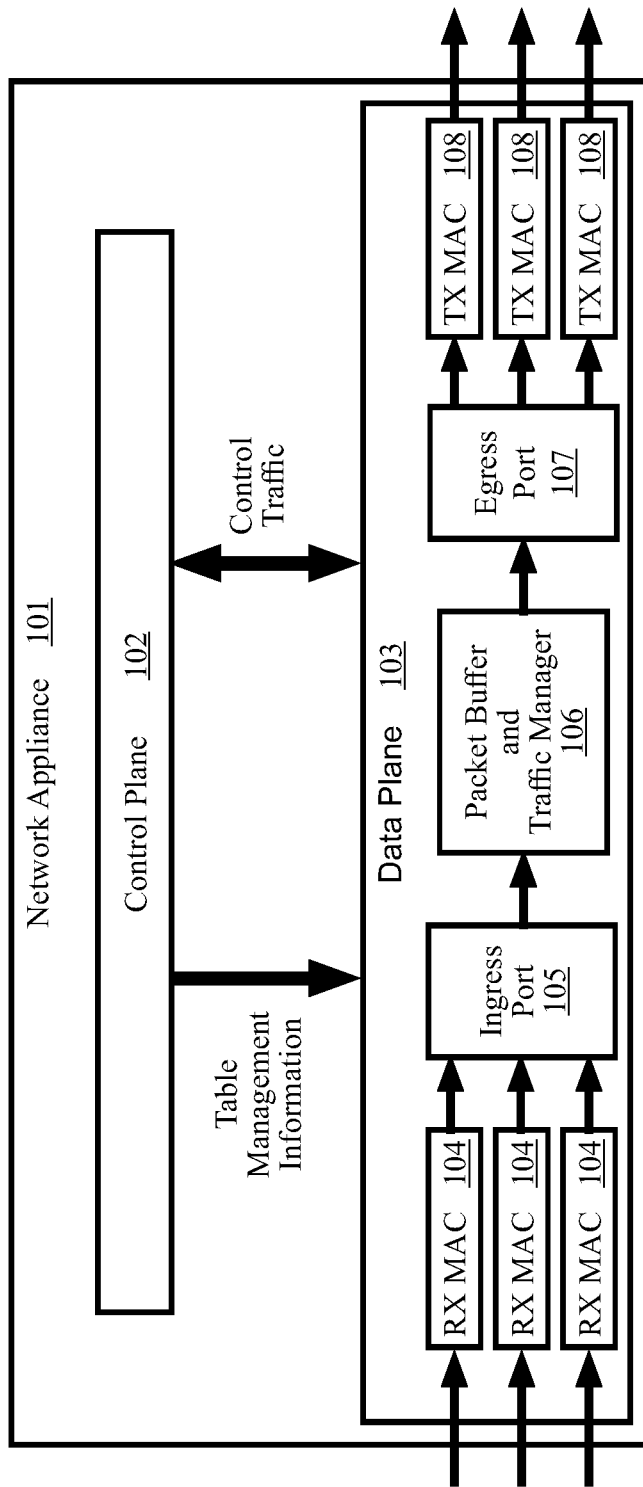
FIG. 1 is a functional block diagram of a network appliance having a control plane and a data plane and in which aspects may be implemented.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

In the field of data networking, the functionality of network appliances such as switches, routers, and network interface cards (NICs) is often described in terms of functionality that is associated with a "control plane" and functionality that is associated with a "data plane." In general, the control plane refers to components and/or operations that are involved in managing forwarding information and the data plane refers to components and/or operations that are involved in forwarding packets from an input interface to an output interface according to the forwarding information provided by the control plane. The data plane may also refer to components and/or operations that implement packet processing operations related to encryption, decryption, compression, decompression, firewalling, and telemetry.

FIG. 1 is a functional block diagram of a network appliance 101 having a control plane 102 and a data plane 103 and in which aspects may be implemented. As illustrated in FIG. 1, the control plane provides forwarding information (e.g., in the form of table management information) to the data plane and the data plane receives packets on input interfaces, processes the received packets, and then forwards packets to desired output interfaces. Additionally, control traffic (e.g., in the form of packets) may be communicated from the data plane to the control plane and/or from the control plane to the data plane. The data plane and control plane are sometimes referred to as the "fast" plane and the "slow" plane, respectively. In general, the control plane is responsible for less frequent and less time-sensitive operations such as updating Forwarding Information Bases (FIBs) and Label Forwarding Information Bases (LFIBs), while the data plane is responsible for a high volume of time-sensitive forwarding decisions that need to be made at a rapid pace. In some embodiments, the control plane may implement operations related to packet routing that include Open Shortest Path First (OSPF), Enhanced Interior Gateway Routing Protocol (EIGRP), Border Gateway Protocol (BGP), Intermediate System to Intermediate System (IS-IS), Label Distribution Protocol (LDP), routing tables and/or operations related to packet switching that include Address Resolution Protocol (ARP) and Spanning Tree Protocol (STP). In some embodiments, the data plane (which may also be referred to as the "forwarding" plane) may implement operations related to parsing packet headers, Quality of Service (QoS), filtering, encapsulation, queuing, and policing. Although some functions of the control plane and data plane are described, other functions may be implemented in the control plane and/or the data plane.

Often times, the high-volume and rapid decision-making that occurs at the data plane is implemented in fixed function application specific integrated circuits (ASICs). Although fixed function ASICs enable high-volume and rapid packet processing, fixed function ASICs typically do not provide enough flexibility to adapt to changing needs. Data plane processing can also be implemented in field programmable gate arrays (FPGAs) to provide a high level of flexibility in data plane processing. Although FPGAs are able to provide a high level of flexibility for data plane processing, FPGAs are relatively expensive to produce and consume much more power than ASICs on a per-packet basis.

Some techniques exist for providing flexibility at the data plane of network appliances that are used in data networks. For example, the concept of a domain-specific language for programming protocol-independent packet processors, known simply as "P4," has developed as a way to provide some flexibility at the data plane of a network appliance. The P4 domain-specific language for programming the data plane of network appliances is currently defined in the "P4$_{16}$ Language Specification," version 1.2.0, as published by the P4 Language Consortium on Oct. 23, 2019, which is incorporated by reference herein. P4 (also referred to herein as the "P4 specification," the "P4 language," and the "P4 program") is designed to be implementable on a large variety of targets including programmable NICs, software switches, FPGAs, and ASICs. As described in the P4 specification, the primary abstractions provided by the P4 language relate to header types, parsers, tables, actions, match-action units, control flow, extern objects, user-defined metadata, and intrinsic metadata.

The data plane 103 includes multiple receive media access controllers (MACs) (RX MAC) 104, an ingress port 105, a packet buffer/traffic manager 106, an egress port 107, and multiple transmit MACs (TX MAC) 108. The data plane elements described may be implemented, for example, as a P4 programmable switch architecture (PSA) or as a P4 programmable NIC, although architectures other than a PSA and a P4 programmable NIC are also possible.

The RX MAC 104 implements media access control on incoming packets via, for example, a MAC protocol such as Ethernet. In an embodiment, the MAC protocol is Ethernet and the RX MAC is configured to implement operations related to, for example, receiving frames, half-duplex retransmission and backoff functions, Frame Check Sequence (FCS), interframe gap enforcement, discarding malformed frames, and removing the preamble, Start Frame Delimiter (SFD), and padding from a packet. Likewise, the TX MAC 108 implements media access control on outgoing packets via, for example, Ethernet. In an embodiment, the TX MAC is configured to implement operations related to, for example, transmitting frames, half-duplex retransmission and backoff functions, appending an FCS, interframe gap enforcement, and prepending a preamble, an SFD, and padding. The packet buffer/traffic manager 106 includes memory and/or logic to implement packet buffering and/or traffic management. In an embodiment, operations implemented via the packet buffer/traffic manager include, for example, packet buffering, packet scheduling, and/or traffic shaping.

The ingress port 105 and egress port 107 can be packet processing pipelines that operate at the data plane of a network appliance and can be programmable via a domain-specific language such as P4. In an embodiment, the ingress port 105 and egress port 107 can be programmed to implement various operations at the data plane such as, for example, routing, bridging, tunneling, forwarding, network access control lists (ACLs), Layer 4 (L4) firewalls, flow-based rate limiting, VLAN tag policies, group membership, isolation, multicast, group control, label push/pop operations, L4 load-balancing, L4 flow tables for analytics and flow specific processing, distributed denial of service (DDoS) attack detection, DDoS attack mitigation, and telemetry data gathering on any packet field or flow state.

Figure 2:
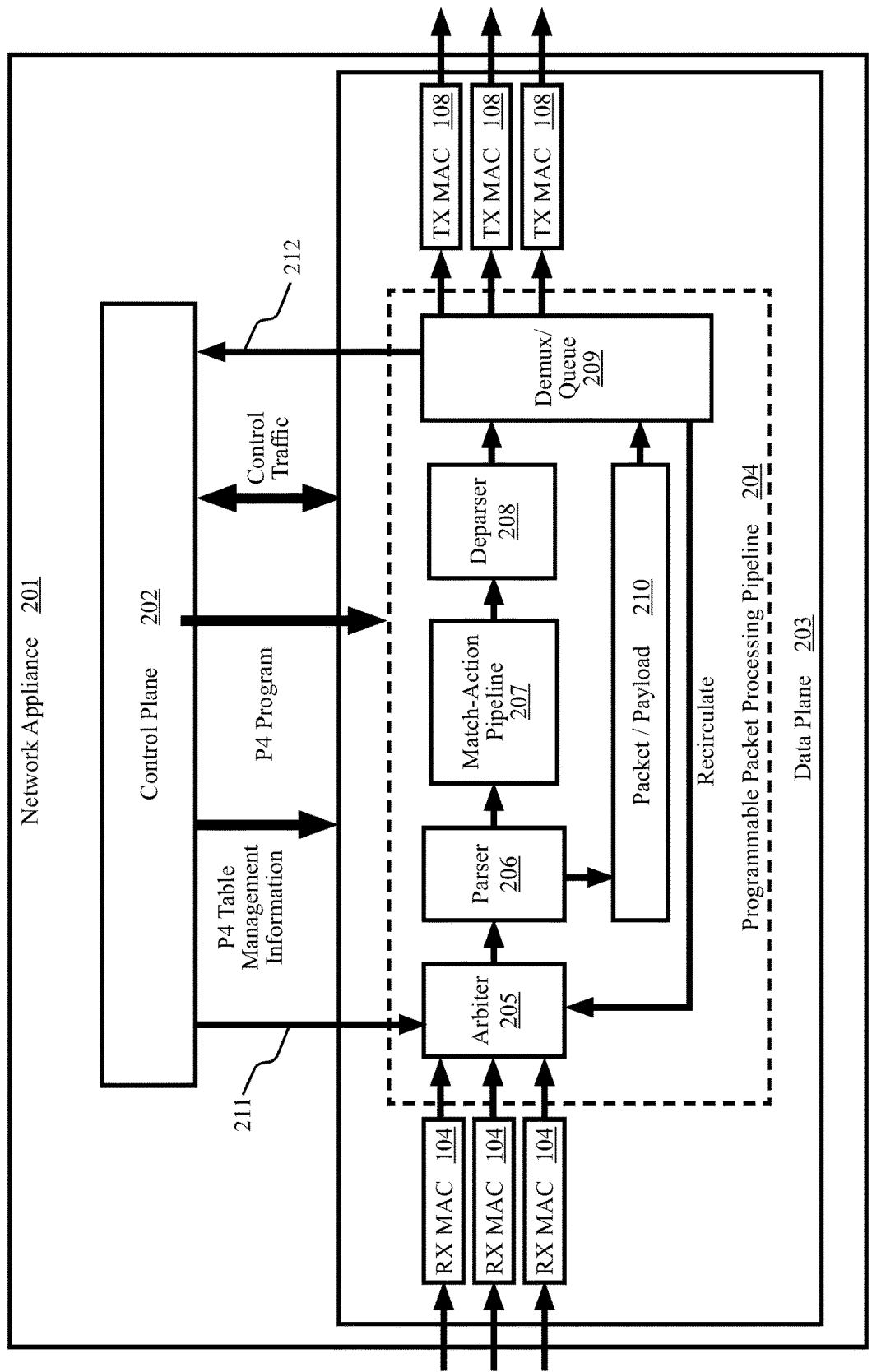
FIG. 2 is a depiction of a network appliance in which the data plane is programmable according to the P4 domain-specific language and in which aspects may be implemented.

FIG. 2 is a depiction of a network appliance 201 in which the data plane 203 is programmable according to the P4 domain-specific language and in which aspects may be implemented. As illustrated in FIG. 2, a P4 program is provided to the data plane via the control plane 202. The P4 program includes software code that configures the functionality of the data plane to implement particular processing and/or forwarding logic and processing and/or forwarding tables are populated and managed via P4 table management information that is provided to the data plane from the control plane. Control traffic (e.g., in the form of packets) may be communicated from the data plane to the control plane and/or from the control plane to the data plane. In the context of P4, the control plane corresponds to a class of algorithms and the corresponding input and output data that are concerned with the provisioning and configuration of the data plane and the data plane corresponds to a class of algorithms that describe transformations on packets by packet processing systems.

The data plane 203 includes a programmable packet processing pipeline 204 that is programmable using a domain-specific language such as P4 and that can be used to implement the programmable packet processing pipeline 204. As described in the P4 specification, a programmable packet processing pipeline includes an arbiter 205, a parser 206, a match-action pipeline 207, a deparser 208, and a demux/queue 209. The arbiter 205 can act as an ingress unit receiving packets from RX-MACs 104 and can also receive packets from the control plane via a control plane packet input 211. The arbiter 205 can also receive packets that are recirculated to it by the demux/queue 209. The demux/queue 209 can act as an egress unit and can also be configured to send packets to a drop port (the packets thereby disappear), to the arbiter via recirculation, and to the control plane 202 via an output CPU port. The control plane is often referred to as a CPU (central processing unit) although, in practice, control planes often include multiple CPUs and other elements. The arbiter 205 and the demux/queue 209 can be configured through the domain-specific language (e.g., P4).

The parser 206 is a programmable element that is configured through the domain-specific language (e.g., P4) to extract information from a packet (e.g., information from the header of the packet). As described in the P4 specification, parsers describe the permitted sequences of headers within received packets, how to identify those header sequences, and the headers and fields to extract from packets. In an embodiment, the information extracted from a packet by the parser is referred to as a packet header vector or "PHV." In an embodiment, the parser identifies certain fields of the header and extracts the data corresponding to the identified fields to generate the PHV. In an embodiment, the PHV may include other data (often referred to as "metadata") that is related to the packet but not extracted directly from the header, including for example, the port or interface on which the packet arrived at the network appliance. Thus, the PHV may include other packet related data (metadata) such as input/output port number, input/output interface, or other data in addition to information extracted directly from the packet header. The PHV produced by the parser may have any size or length. For example, the PHV may be at least 4 bits, 8 bits, 16 bits, 32 bits, 64 bits, 128 bits, 256 bits, or 512 bits. In some cases, a PHV having even more bits (e.g., 6 Kb) may include all relevant header fields and metadata corresponding to a received packet. The size or length of a PHV corresponding to a packet may vary as the packet passes through the match-action pipeline.

The deparser 208 is a programmable element that is configured through the domain-specific language (e.g., P4) to generate packet headers from PHVs at the output of match-action pipeline 207 and to construct outgoing packets by reassembling the header(s) (e.g., Ethernet and IP headers) as determined by the match-action pipeline. In some cases, a packet payload may travel in a separate queue or buffer, such as a first-in-first-out (FIFO) queue, until the packet payload is reassembled with its corresponding PHV at the deparser to form a packet. The deparser may rewrite the original packet according to the PHV fields that have been modified (e.g., added, removed, or updated). In some cases, a packet processed by the parser may be placed in a packet buffer/traffic manager (e.g. FIG. 1, element 106) for scheduling and possible replication. In some cases, once a packet is scheduled and leaves the packet buffer/traffic manager, the packet may be parsed again to generate an egress PHV. The egress P1-V may be passed through a match-action pipeline after which a final deparser operation may be executed (e.g., at deparser 208) before the demux/queue 209 sends the packet to the TX MAC 108 or recirculates it back to the arbiter 205 for additional processing.

Figure 3:
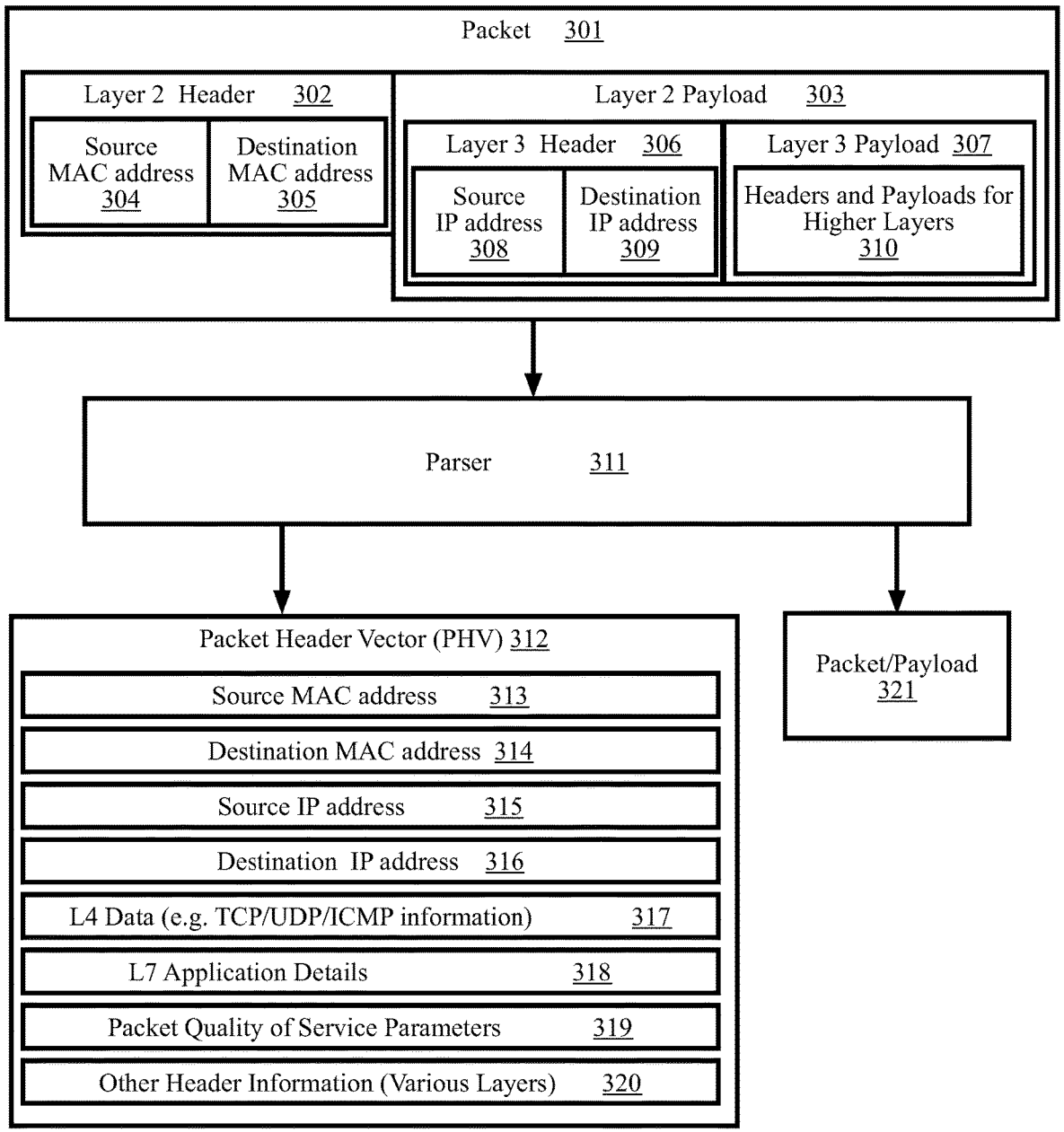
FIG. 3 is a high-level diagram illustrating an example of generating a packet header vector from a packet according to some aspects.

FIG. 3 is a high-level diagram illustrating an example of generating a packet header vector 312 from a packet 301 according to some aspects. In general, packets can be constructed and interpreted in accordance with the internet protocol suite. The Internet protocol suite is the conceptual model and set of communications protocols used in the Internet and similar computer networks. A packet 301 can be transmitted and received as a raw bit stream over a physical medium at the physical layer, sometimes called layer 1. Packet 301 can be received by a RX MAC 104 as a raw bit stream or transmitted by TX MAC 108 as a raw bit stream.

The link layer is often called layer 2. The protocols of the link layer operate within the scope of the local network connection to which a host is attached and includes all hosts accessible without traversing a router. The link layer is used to move packets between the interfaces of two different hosts on the same link. Packet 301 has a layer 2 header 302 and layer 2 payload 303. The layer 2 header can contain a source MAC address 304 and a destination MAC address. The input ports 104 and output ports 108 of a network appliance 201 can have MAC addresses. In some embodiments a network appliance 201 has a MAC address that is applied to all or some of the ports. In some embodiments one or more of the ports each have their own MAC address. In general, each port can send and receive packets. As such, a port of a network appliance can be configured with a RX MAC 104 and a TX MAX 108. Ethernet, also known as Institute of Electrical and Electronics Engineers (IEEE) 802.3 is a layer 2 protocol. IEEE 802.11 (WiFi) is another widely used layer 2 protocol. The layer 2 payload 303 can include a Layer 3 packet.

The internet layer, often called layer 3, is the network layer where layer 3 packets can be routed from a first node to a second node across multiple intermediate nodes. The nodes can be network appliances such as network appliance 201. Internet protocol (IP) is a commonly used layer 3 protocol. The layer 3 packet can have a layer 3 header 306 and a layer 3 payload 307. The layer 3 header 306 can have a source IP address 308 and a destination IP address 309. As an example, a first node can send an IP packet to a second node via an intermediate node. The IP packet therefor has a source IP address indicating the first node and a destination IP address indicating the second node. The first node makes a routing decision that the IP packet should be sent to the intermediate node. The first node therefor sends the IP packet to the intermediate node in a first layer 2 packet. The first layer 2 packet has a source MAC address 304 indicating the first node, a destination MAC address 305 indicating the intermediate node, and has the IP packet as a payload. The intermediate node receives the first layer 2 packet. Based on the destination IP address, the intermediate node determines that the IP packet is to be sent to the second node. The intermediate node sends the IP packet to the second node in a second layer 2 packet having a source MAC address 304 indicating the intermediate node, a destination MAC address 305 indicating the second node, and the IP packet as a payload. The layer 3 payload 307 can include headers and payloads for higher layers 310 in accordance with higher layer protocols such as transport layer protocols.

The transport layer, often called layer 4, can establish basic data channels that applications use for task-specific data exchange and can establish host-to-host connectivity. Transmission control protocol (TCP), user datagram protocol (UDP), and internet control message protocol (ICMP) are common layer 4 protocols. TCP is often referred to as TCP/IP. TCP is connection oriented and can provide reliable, ordered, and error-checked delivery of a stream of bytes between applications running on hosts communicating via an IP network. When carrying TCP data, a layer 3 payload 307 includes a TCP header and a TCP payload. UDP can provide for computer applications to send messages, in this case referred to as datagrams, to other hosts on an IP network using a connectionless model. When carrying UDP data, a layer 3 payload 307 includes a UDP header and a UDP payload. ICMP is used by network devices, including routers, to send error messages and operational information indicating success or failure when communicating with another IP address. ICMP uses a connectionless model.

The application layer, often called layer 7, includes the protocols used by most applications for providing user services or exchanging application data over the network connections established by the lower level protocols. Examples of application layer protocols include the Hypertext Transfer Protocol (HTTP), the File Transfer Protocol (FTP), the Simple Mail Transfer Protocol (SMTP), and the Dynamic Host Configuration Protocol (DHCP). Data coded according to application layer protocols can be encapsulated into transport layer protocol units (such as TCP or UDP messages), which in turn use lower layer protocols to effect actual data transfer.

Returning now to FIG. 3, the parser 311 can receive a packet 301 that has layer 2, layer 3, layer 4, and layer 7 headers and payloads. The parser can generate a packet header vector (PHV) from packet 301. The packet header vector can include many data fields including source MAC address 313, destination MAC address 314, source IP address 315, destination IP address 316, L4 data 317, L7 application details 318, packet quality of service parameters 319, and other header information 320. The source MAC address 313 can be obtained from the layer 2 header 302. The destination MAC address 314 can be obtained from the layer 2 header 302. The source IP address 315 can be obtained from the layer 3 header 306. The destination IP address 316 can be obtained from the layer 3 header 306.

The L4 data 317 can be obtained from the layer 4 header in the layer 3 payload 307. The L7 application details 318 can be obtained from the headers and payloads for higher layers 310. The packet quality of service parameters 319 can be obtained from the layer 3 header 319 or another header based on implementation specific details. The other header information 320 is the other information contained in the layer 2, layer 3, layer 4, and layer 7 headers. Those practiced in computer networking protocols realize that the headers carry much more information than that described here, realize that substantially all of the headers are standardized by documents detailing header contents and fields, and know how to obtain those documents. The parser can also be configured to output a packet or payload 321. Recalling that the parser 311 is a programmable element that is configured through the domain-specific language (e.g., P4) to extract information from a packet, the specific contents of the packet or payload 321 are those contents specified via the domain specific language. For example, the contents of the packet or payload 321 can be the layer 3 payload.

Figure 4:
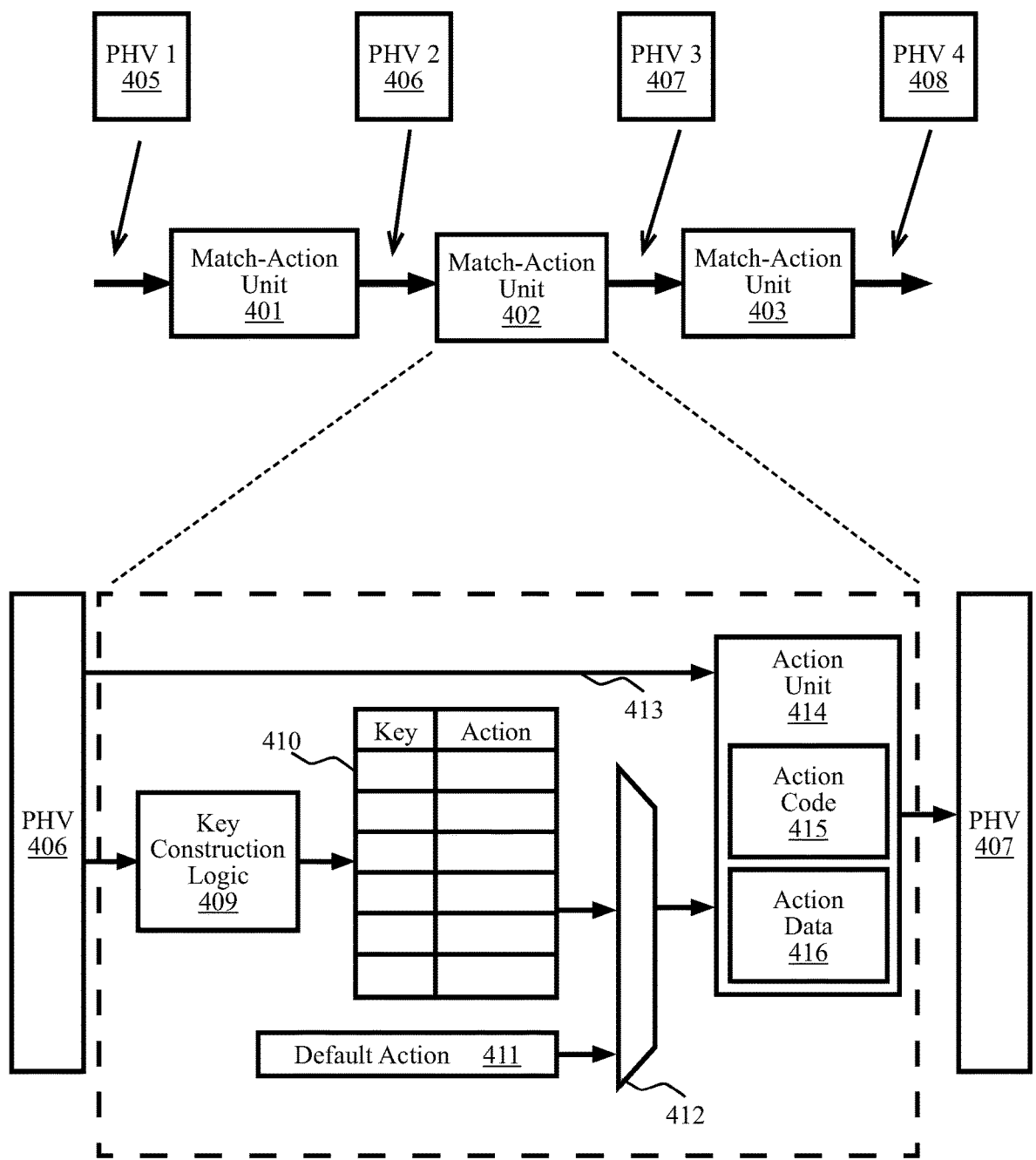
FIG. 4 is a functional block diagram illustrating an example of a match-action unit in a match-action pipeline according to some aspects.

FIG. 4 is a functional block diagram illustrating an example of a match-action unit 402 in a match-action pipeline 400 according to some aspects. The match-action units 401, 402, 403 of the match-action pipeline 400 are programmed to perform "match+action" operations in which a match unit performs a lookup using at least a portion of the PHV and an action unit performs an action based on an output from the match unit. In an embodiment, a PHV generated at the parser is passed through each of the match-action units in the match-action pipeline in series and each match-action unit implements a match+action operation. The PHV and/or table entries may be updated in each stage of match-action processing according to the actions specified by the P4 programming. In some instances, a packet may be recirculated through the match-action pipeline, or a portion thereof, for additional processing. Match-action unit 1 401 receives PHV 1 405 as an input and outputs PHV 2 406. Match-action unit 2 402 receives PHV 2 406 as an input and outputs PHV 3 407. Match-action unit 3 403 receives PHV 3 407 as an input and outputs PHV 4 408.

An expanded view of elements of a match-action unit 402 of match action pipeline 400 is shown. The match-action unit includes a match unit 417 (also referred to as a "table engine") that operates on an input PHV 406 and an action unit 414 that produces an output PHV 407, which may be a modified version of the input PHV 406. The match unit 417 includes key construction logic 409, a lookup table 410, and selector logic 412. The key construction logic 409 is configured to generate a key from at least one field in the PHV. The lookup table 410 is populated with key-action pairs, where a key-action pair includes a key (e.g., a lookup key) and corresponding action code 415 and/or action data 416. In an embodiment, a P4 lookup table generalizes traditional switch tables, and can be programmed to implement, for example, routing tables, flow lookup tables, ACLs, and other user-defined table types, including complex multi-variable tables. The key generation and lookup function constitute the "match" portion of the operation and produce an action that is provided to the action unit via the selector logic. The action unit executes an action over the input data (which may include data 413 from the PHV) and provides an output that forms at least a portion of the output PHV. For example, the action unit executes action code 415 on action data 416 and data 413 to produce an output that is included in the output PHV. If no match is found in the lookup table, then a default action 411 may be implemented. In an embodiment, operations of the match-action unit are programmable in the control plane via P4 and the contents of the lookup table is managed by the control plane.

Figure 5:
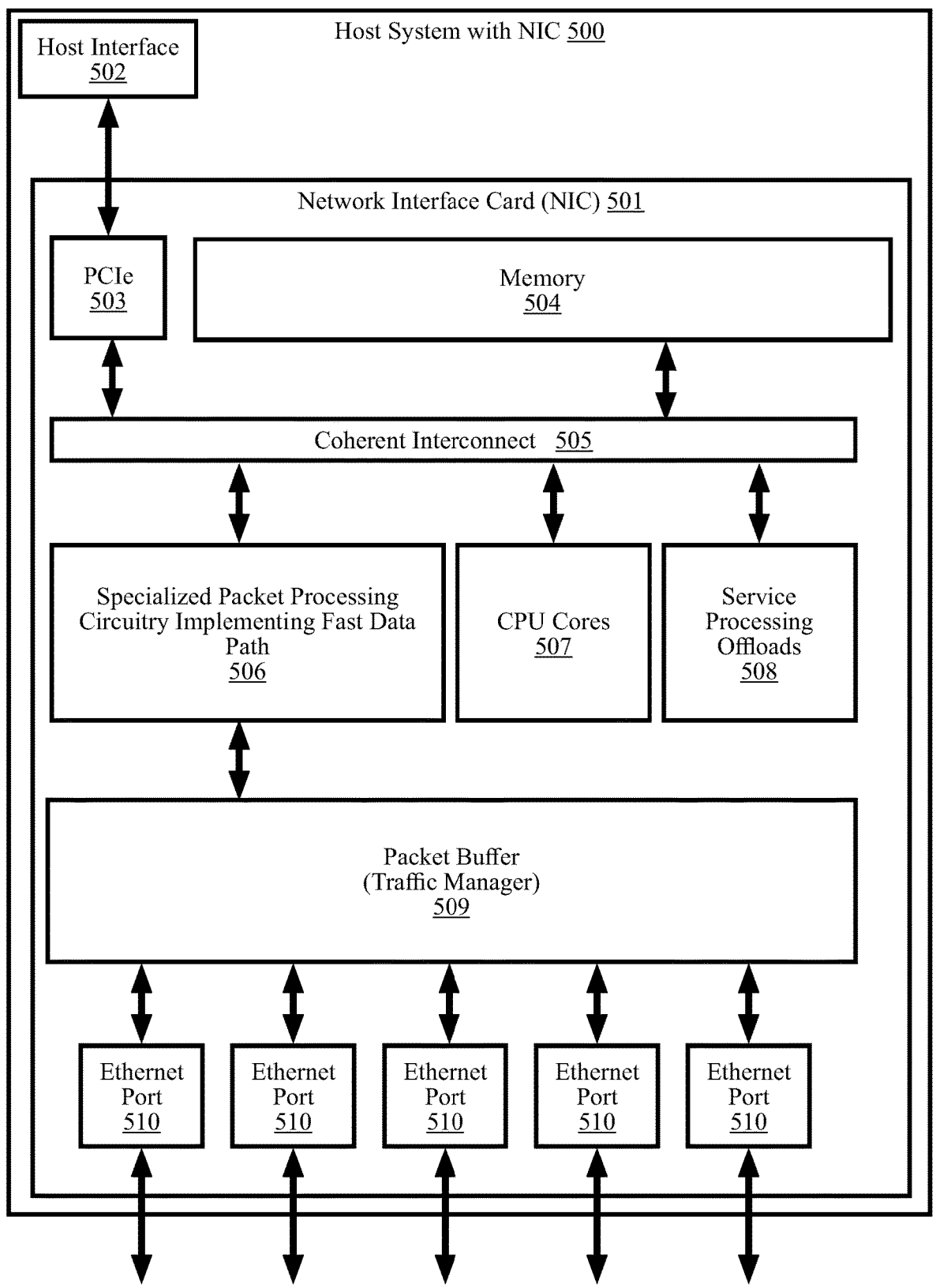
FIG. 5 is a high-level diagram of a network interface card configured as a network appliance according to some aspects.

FIG. 5 is a high-level diagram of a network interface card (NIC) 501 configured as a network appliance according to some aspects. Aspects of the embodiments, including packet processing pipelines, fast data paths, and slow data paths, can be implemented in the NIC 501. The NIC 501 can be configured for operation within a host system 500. The host system can be a general-purpose computer with a host interface 502 such as a PCIe interface. The NIC 501 can have a PCIe interface 503 through which it can communicate with the host system 500. The NIC can also include a memory 504, a coherent interconnect 505, specialized packet processing circuitry implementing a fast data path 506, CPU cores 507, service processing offloads 508, packet buffer 509, and ethernet ports 510.

The NIC 501 can include a memory for running Linux, storing large data structures such as flow tables and other analytics, and providing buffering resources for advanced features including TCP termination and proxy, deep packet inspection, storage offloads, and connected FPGA functions. The memory system may comprise a high bandwidth module (HBM) module which may support 4 GB capacity, 8 GB capacity, or some other capacity depending on package and HBM. The HBM may be required for accessing full packets at wire speed. Wire speed refers to the speed at which packets can move through a communications network. For example, each of the ethernet ports can be a 100 Gbps port. Wire speed for the network appliance may therefore be operation at 100 Gbps for each port. HBMs operating at over 1 Tb/s are currently available.

In an embodiment, the CPU cores 507 are general purpose processor cores, such as ARM processor cores, Microprocessor without Interlocked Pipeline Stages (MIPS) processor cores, and/or x86 processor cores, as is known in the field. In an embodiment, each CPU core includes a memory interface, an ALU, a register bank, an instruction fetch unit, and an instruction decoder, which are configured to execute instructions independently of the other CPU cores. In an embodiment, the CPU cores are Reduced Instruction Set Computers (RISC) CPU cores that are programmable using a general-purpose programming language such as C.

In an embodiment, each CPU core 507 also includes a bus interface, internal memory, and a memory management unit (MMU) and/or memory protection unit (MPU). For example, the CPU cores may include internal cache, e.g., L1 cache and/or L2 cache, and/or may have access to nearby L2 and/or L3 cache. In an embodiment, each CPU core includes core-specific L1 cache, including instruction-cache and data-cache and L2 cache that is specific to each CPU core or shared amongst a small number of CPU cores. L3 cache may also be available to the CPU cores.

In an embodiment there are four CPU cores 507 available for control plane functions and for implementing aspects of a slow data path that includes software implemented packet processing functions. The CPU cores may be used to implement discrete packet processing operations such as L7 applications (e.g., HTTP load balancing, L7 firewalling, and/or L7 telemetry), flow table insertion or table management events, connection setup/management, multicast group join, deep packet inspection (DPI) (e.g., URL inspection), storage volume management (e.g., NVMe volume setup and/or management), encryption, decryption, compression, and decompression, which may not be readily implementable through a domain-specific language such as P4, in a manner that provides fast path performance as is expected of data plane processing.

The service processing offloads 508 are specialized hardware modules purposely optimized to handle specific tasks at wire speed, such as cryptographic functions and compression/decompression.

The packet buffer 509 can act as a central on-chip packet switch that delivers packets from the network interfaces 510 to packet processing elements of the data plane and vice-versa. The packet processing elements can include a slow data path implemented in software and a fast data path implemented by specialized packet processing circuitry 506.

The specialized packet processing circuitry implementing a fast data path 506 can be one or more ASICs or FPGAs implementing a programmable packet processing pipeline such as the programmable packet processing pipeline 204 of FIG. 2. Some embodiments include ASICs or FPGAs implementing a P4 pipeline as a fast data path within the network appliance. The fast data path is called the fast data path because it processes packets faster than a slow data path that can also be implemented within the network appliance. An example of a slow data path is a software implemented data path wherein the CPU cores 507 and memory 504 are configured via software to implement a slow data path. A network appliance having two data paths has a fast data path and a slow data path when one of the data paths process packets faster than the other data path.

All memory transactions in the NIC 501, including host memory, on board memory, and registers may be connected via a coherent interconnect 505. In one non-limiting example, the coherent interconnect can be provided by a network on a chip (NOC) "IP core". Semiconductor chip designers may license and use prequalified IP cores within their designs. Prequalified IP cores may be available from third parties for inclusion in chips produced using certain semiconductor fabrication processes. A number of vendors provide NOC IP cores. The NOC may provide cache coherent interconnect between the NOC masters, including the specialized packet processing circuitry implementing a fast data path 506, CPU cores 507, and PCIe 503. The interconnect may distribute memory transactions across a plurality of memory interfaces using a programmable hash algorithm. All traffic targeting the memory may be stored in a NOC cache (e.g., 1 MB cache). The NOC cache may be kept coherent with the CPU core caches. The NOC cache may be used to aggregate memory write transactions which may be smaller than the cache line (e.g., size of 64 bytes) of an HBM.

Some network appliances have software implemented data planes. An example of a software implemented data plane is a general-purpose computer configured via software to implement a packet processing pipeline in a software implemented data plane. Some network appliances have data planes implemented using special purpose packet processing circuitry within ASICs or FPGAs. Hardware implementations (special purpose packet processing circuitry) and software implementations have certain advantages and disadvantages relative to one another. Hardware implementations can provide faster throughput while consuming less power. Software implementations can be less expensive and more adaptable. With respect to P4 pipelines, the tradeoffs are particularly significant with respect to the lookup tables.

Hardware implementations can have lookup tables implemented with content addressable memory (CAM) or tertiary CAM (TCAM). CAM and TCAM result in extremely fast lookups, which is important when wire speed operation is desired. CAM and TCAM memories, however, are much more expensive per unit of storage than other memory types such as random-access memory (RAM), dynamic RAM (DRAM), static RAM (SRAM). CAM and TCAM also require more circuitry per unit of storage than other memory types. Furthermore, the size of a lookup table implemented using CAM or TCAM is set by the special purpose circuitry.

Software implementations can have lookup tables implemented by software using system memory. As such, the lookup tables can be far larger than those implemented in hardware using CAM or TCAM. The disadvantage is that the software implementations are much slower than the hardware implementations.

Some embodiments have a fast data path that can be implemented in hardware using special purpose packet processing circuitry and a slow data path implemented in software. A traffic flow received by the network appliance can be processed by the slow data path when, for example, the lookup tables in the fast data path are full.

Figure 6:
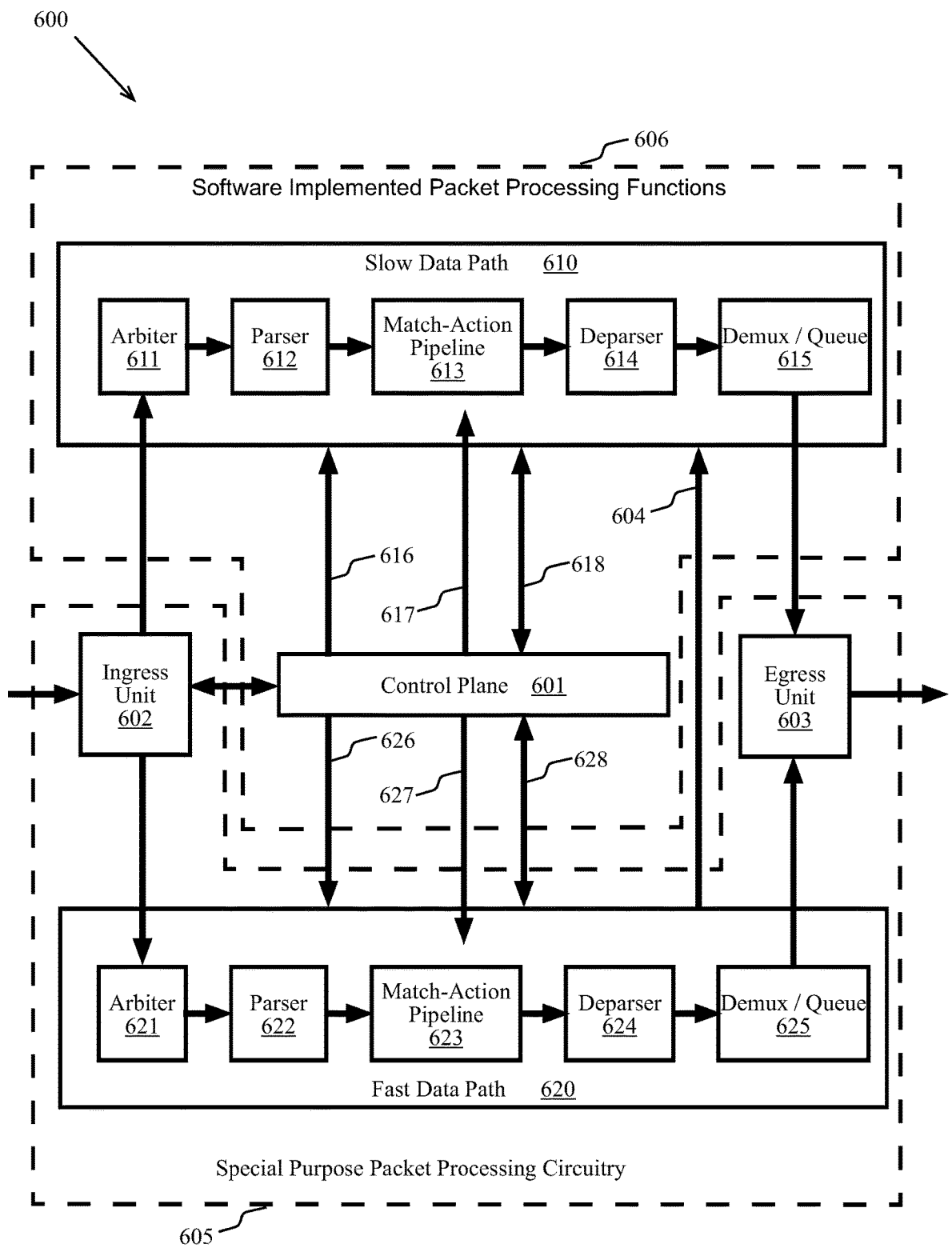
FIG. 6 is a high-level functional block diagram of an example of a network appliance having a fast data path and a slow data path according to some aspects.

FIG. 6 is a high-level functional block diagram of an example of a network appliance 600 having a fast data path 620 and a slow data path 610 according to some aspects. The network appliance 600 can be implemented by the NIC 501 of FIG. 5 with some aspects implemented via special purpose packet processing circuitry 605 and other aspects implemented using software implemented packet processing functions. The special purpose packet processing circuitry 605 can implement an ingress unit 602, an egress unit 603, and a fast data path 620. Referring to FIG. 2, the ingress unit 602 can include RX MACs and the egress unit can include TX MACs. The fast data path 620 is a P4 processing pipeline including an arbiter 621, parser 622, match-action pipeline 623, deparser 624, and a demux/queue 625. The function of the elements of the fast data path are discussed above. In the fast data path, however, those functions are realized using special purpose circuitry.

The CPU cores 507 and memory 504 can implement the software implemented packet processing functions 606 such as the control plane 601 and the slow data path 610. The control plane 601 can provide P4 programs 627 to the fast data path 620 to configure the fast data path to implement particular processing and/or forwarding logic and processing and/or forwarding tables are populated and managed via P4 table management information 626 that is provided to the fast data path from the control plane. Control traffic 628 (e.g., in the form of packets) may be communicated from the fast data path to the control plane and/or from the control plane to the fast data path.

The slow data path 610 is a P4 processing pipeline including an input queue 612, a match-action pipeline 613, and an output queue 615. The control plane 601 can provide P4 programs 617 to the slow data path 610 to configure the slow data path to implement particular processing and/or forwarding logic and processing and/or forwarding tables are populated and managed via P4 table management information 616 that is provided to the slow data path from the control plane. Control traffic 618 (e.g., in the form of packets) may be communicated from the slow data path to the control plane and/or from the control plane to the slow data path.

The ingress unit 602 can receive the first packet for a new traffic flow and pass it to the arbiter 621 that can pass the packet to the parser 622. The parser 622 can produce a PHV based on the first packet and send that PHV to the match action pipeline. The first match-action unit of the match-action pipeline can generate a table miss because the packet is the first packet of a new flow and the new flow has not been installed in the match-action pipeline. The PHV can therefore be sent to the control plane 601. The control plane 601 can then select a data path for the new traffic flow.

If the fast data path 620 is selected for the new traffic flow then the control plane 601 installs the new traffic flow in the fast data path 620. Installing a traffic flow in the fast data path can include entering keys and actions into the match action tables. The keys are based on the PHV. Once the new traffic flow is installed, the fast data path can process the first packet and the following packets of the new traffic flow. The following packets in the new traffic flow do not cause a table miss after the new traffic flow is installed in the fast data path.

If the slow data path is selected for the new traffic flow then the control plane 601 installs the new traffic flow in the slow data path 610. Installing the new traffic flow in the slow data path can include entering keys and actions into the match action tables. The keys are based on the PHV. Once the new traffic flow is installed in the slow data path, the slow data path can process all the packets in the new traffic flow. In this case, every packet for the new traffic flow causes a table miss in the fast data path 620. The new traffic flow packets 604 are sent from the fast data path 620 to the slow data path 610 via the control plane and placed on the input queue 612. The match-action pipeline 613 of the slow data path 610 processes the new traffic flow packets and places them on the output queue 614. From the output queue 614, the new traffic flow packets 604 pass back to the fast data path 620 via the control plane 601 where they can be processed by the deparser 624, demux/queue 625, and egress unit 603.

FIG. 6 illustrates an implementation having a slow data path implemented via software and a fast data path implemented via special purpose packet processing circuitry. Other implementations can have a slow data path implemented at least in part using special purpose hardware. Yet other implementations can have a fast data path implemented in software. The key difference between the data paths is that over a given time period the fast data path can process more packets than the slow data path can process, assuming both data paths are configured to process those packets. Those practiced in software are aware of the tradeoffs between speed, complexity, and flexibility when crafting software. Those practiced in hardware are aware of the tradeoffs between speed, complexity, and flexibility when crafting hardware.

The control plane can also tear down traffic flows by deleting them from the match action tables or by overwriting them in the match action tables. The network appliance can detect that a traffic flow is ready to be torn down in a number of ways. Connection oriented protocols have standardized methods for terminating a connection and the traffic flow can be torn down when that termination method is detected. For some protocols, including many connection oriented protocols, a traffic flow can be torn down when the network appliance detects a FIN/ACK exchange or a RESET packet. For example, a TCP session can be terminated by a FIN/ACK exchange or RESET packet. Timeouts can also be used to detect a flow is ready to be torn down. Each traffic flow can be associated with a timer that is reset every time a packet for the traffic flow is received. If the timer times out then the network appliance can tear down the traffic flow.

The special purpose hardware of the fast data path is more efficiently used for some traffic flows than for others. In broad terms, the time for processing a traffic flow is the sum of: the installation time, $t_{in}$, the processing time, and the tear down time, $t_{td}$. In an ideal world, the fast data path can process all the traffic flows. The world not being ideal, some traffic flows have to be processed by the slow data path. It has been determined that processing long lived flows in the fast data path increases hardware utilization, reduces power consumptions, and increases the throughput of network appliances. Short lived flows can be processed by the slow data path or the fast data path, but should not impede the processing of a long lived flow via the fast data path. The difficulty is in predicting ahead of time which traffic flows are going to be long lived flows and which are going to be short lived flows.

Long lived flows and short lived flows can be defined in a number of ways. For example, a threshold duration (e.g. 150 ms) or number of packets (e.g. 1000) can be selected. Traffic flows having a longer duration or more packets are long lived flows and the rest are short lived flows. In another example, traffic flows can be measured and the threshold set based on historical data to, for example, classify 20% of the traffic flows as long lived flows. Yet another option is to determine the total time (ingress to egress) required to process a packet traversing the slow data path, $t_{sp}$. Total time $t_{total}=t_{in}+t_{sp}+t_{td}$. A threshold can be $T=M*t_{total}$ where M is a scaling factor determined by a person such as a network administrator. As such, a network administrator can change M to thereby adjust the threshold between long lived flows and short lived flows, thereby tuning a network appliance to its network traffic load.

Long lived flows remain installed for longer time periods than short lived flows. One heuristic that the network appliance of FIG. 6 can use is to install each new traffic flow in the fast data path if there is room in the lookup tables. Using this heuristic, long lived flows can accumulate in the fast data path because long lived flows remain longer.

Instead of using a simple heuristic, a classification model can be developed and deployed that predicts if a traffic flow is a long lived flow or a short lived flow. In one example, a training engine receives training data gathered from previously observed traffic flows and trains the classification model. Once trained, the classification model can be deployed to network appliances that can thereby predict whether a traffic flow will be long lived or short lived. The network appliances can then choose a data path for each traffic flow based on the prediction. By preferentially using the fast data path to process traffic flows that are predicted to be long lived, the network appliance can have higher throughput and operate more efficiently.

Figure 7:
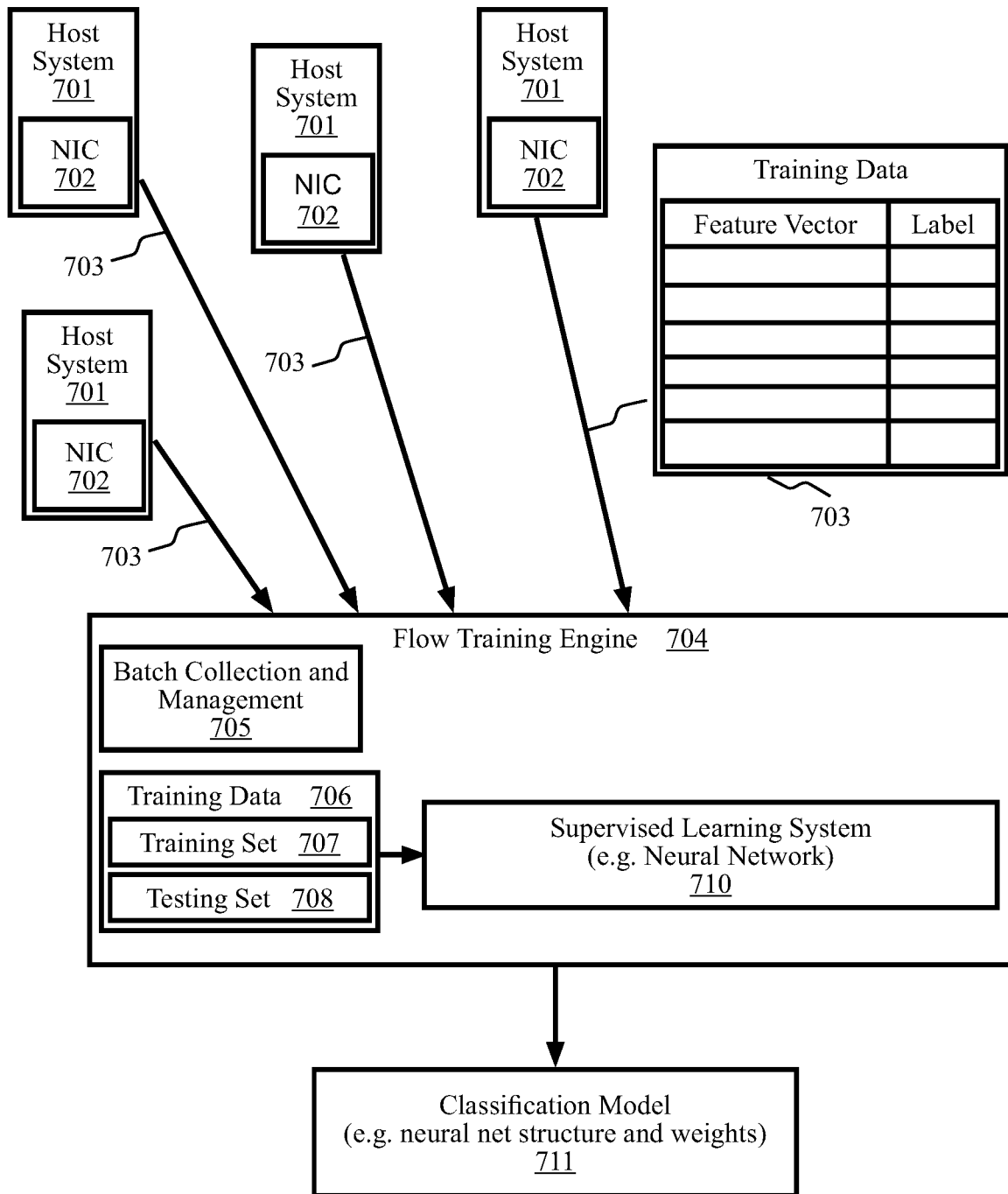
FIG. 7 is a high-level diagram illustrating an example of a flow training engine producing a classification model according to some aspects.

FIG. 7 is a high-level diagram illustrating an example of a flow training engine 704 producing a classification model 711 according to some aspects. Network appliances, such as NICs 702 in host systems 701 can gather training data 703 while in operation. The training data 703 can be collected in the NICs 702 or in the host systems 701. The network appliance's training data 703 can be sent to a flow training engine that can accumulate it into training data 706. The training data includes feature vectors stored in association with labels. Each feature vector is produced based on a traffic flow processed by a network appliance. The labels indicate a class for each traffic flow. For example, the classes can be long lived flow and short lived flow and labels can indicate which of the feature vectors are from long lived flows and which of the feature vectors are from short lived flows.

Some embodiments gather the network appliance's training data 703 for a set period of time such as an hour, a day, or a week before transmitting it to the flow training engine. Such batching can be advantageous because it may strain the network to send training data every time a traffic flow is torn down. The training data does not necessarily contain a feature vector for every traffic flow that has been processed, but may instead be a subset. The subset can be a random sampling, a periodic sampling (every Nth), the head (first N), the tail (last N), or some other subset.

The flow training engine can be configured for batch collection and management 705. Batch collection and management 705 can include gathering the individual network appliance's training data 703 and producing training data 706 for use by the supervised learning system 710. Batch collection and management 705 can include aging out certain data. For example, a classification model 711 can be generated every week using training data from the past two weeks. As such, batch collection and management 705 can discard or archive data more than two weeks old and can assemble training data 706 from data no more than two weeks old. The training data 706 can be divided into one or more training sets 707 and one or more testing sets 708. Those practiced in machine learning are familiar with training sets 707 and testing sets 708.

Figure 8:
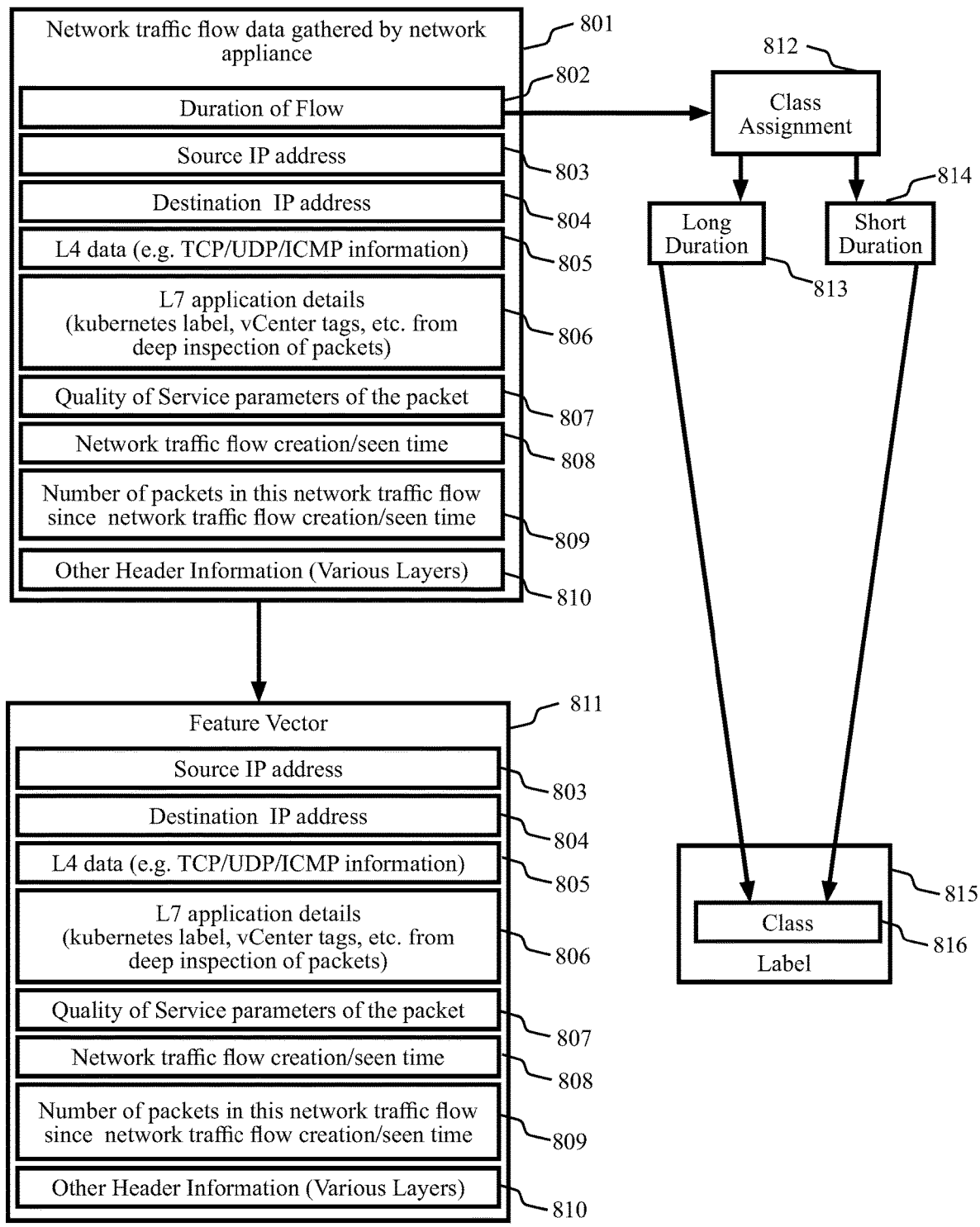
FIG. 8 is a diagram illustrating an example of generating training data from network traffic flow data according to some aspects.

FIG. 8 is a diagram illustrating an example of generating training data from network traffic flow data 801 according to some aspects. Comparing traffic flow data 801 to PHV 312 of FIG. 3, it is seen that much of the traffic flow data 801 can be produced by a parser such as the parser 622 in a fast data path 620 or a parser in another P4 pipeline. As such, the traffic flow data 801 can include data fields including source IP address 803, destination IP address 804, L4 data (e.g. TCP/UDP/ICMP information) 805, L7 application details (kubernetes label, vCenter tags, etc. from deep inspection of packets) 806, packet quality of service parameters 807, and other header information 810. The traffic flow data 801 can also include source MAC address, destination MAC address duration of flow 802, network traffic flow creation and or seen time 809, and number of packets in this network traffic flow since network traffic flow creation/seen time 809. The traffic flow seen time can be the time at which the first packet of a traffic flow was seen. As discussed above, the PHV can include metadata such as the MAC addresses, timestamps, and other data. A packet received timestamp can be carried in the PHV and designated as the traffic flow first seen time when the control plane determines that the traffic flow is a new traffic flow. A new traffic flow is a traffic flow that is not installed in a data path (e.g. the fast data path or slow data path) and is not yet queued for installation in a data path. The flow creation time can be a timestamp stored in association with the traffic flow (e.g. in the PHV or in a flow table) when the traffic flow is installed in a data path. The number of packets in the traffic flow since the traffic flow first seen time can be counted and stored in the PHV or the flow table (e.g. seven packets received before traffic flow creation time). The flow table is a data structure held in memory such as memory 504 that holds data associated with the traffic flows processed by the network appliance.

The duration of flow 802 can be the difference between a later time and a sooner time. The later time can be the time when the traffic flow is scheduled for tear down or when the traffic flow is actually torn down. The sooner time can be the traffic flow first seen time or the traffic flow creation time. The duration can be used to determine if the traffic flow was a short lived flow or a long lived flow. A number of ways for defining a traffic flow as long lived or short lived are discussed above. Class assignment 812 is the assignment of a traffic flow to a class such as long lived flow 813 or short lived flow 814. A label 815 can indicate the class 816 of the traffic flow.

A feature vector 811 can be generated from the traffic flow data 801. As can be seen, the illustrated feature vector can be generated by copying data fields from the traffic flow data 801 into the feature vector. Much or all of the traffic flow data 801 can be in the PHV. The feature vector and the label can be stored in the network appliance's training data 703 with the label indicating the class of the feature vector. Note that the label can be determined as training data is accumulated by the network appliance or can be determined at a later time. For example, duration of flow can be stored in association with the feature vector and used to label the feature vector at a later time such as when training data 706 is assembled by the flow training engine 704. It is an aspect of the embodiments that the feature vectors and labels generated by the network appliances are available for use as training data. It is unlikely that the feature vectors and labels would be otherwise available.

The training data can be used to train a classification model to predict a class when given a feature vector. There are three main categories of machine learning: supervised, unsupervised, and reinforcement. In supervised learning, examples are provided and the learning agent learns from the examples based on feedback. In unsupervised learning, no feedback is provided and the learning agent attempts to find patterns. Reinforcement is often considered a subclass of supervised learning wherein the feedback is limited and succinct. An example of reinforcement learning is a game playing agent wherein the feedback is a won/loss signal received after the game is done. Clustering algorithms are examples of unsupervised learning wherein the learning agent discovers groupings or clusters among the examples. Neural networks and linear regression are examples of supervised learning algorithms. Those practiced in machine learning are familiar with the general categories of machine learning and of many algorithms within each class. Supervised machine learning is an aspect of embodiments discussed in relation to FIGS. 7-14.

Figure 9:
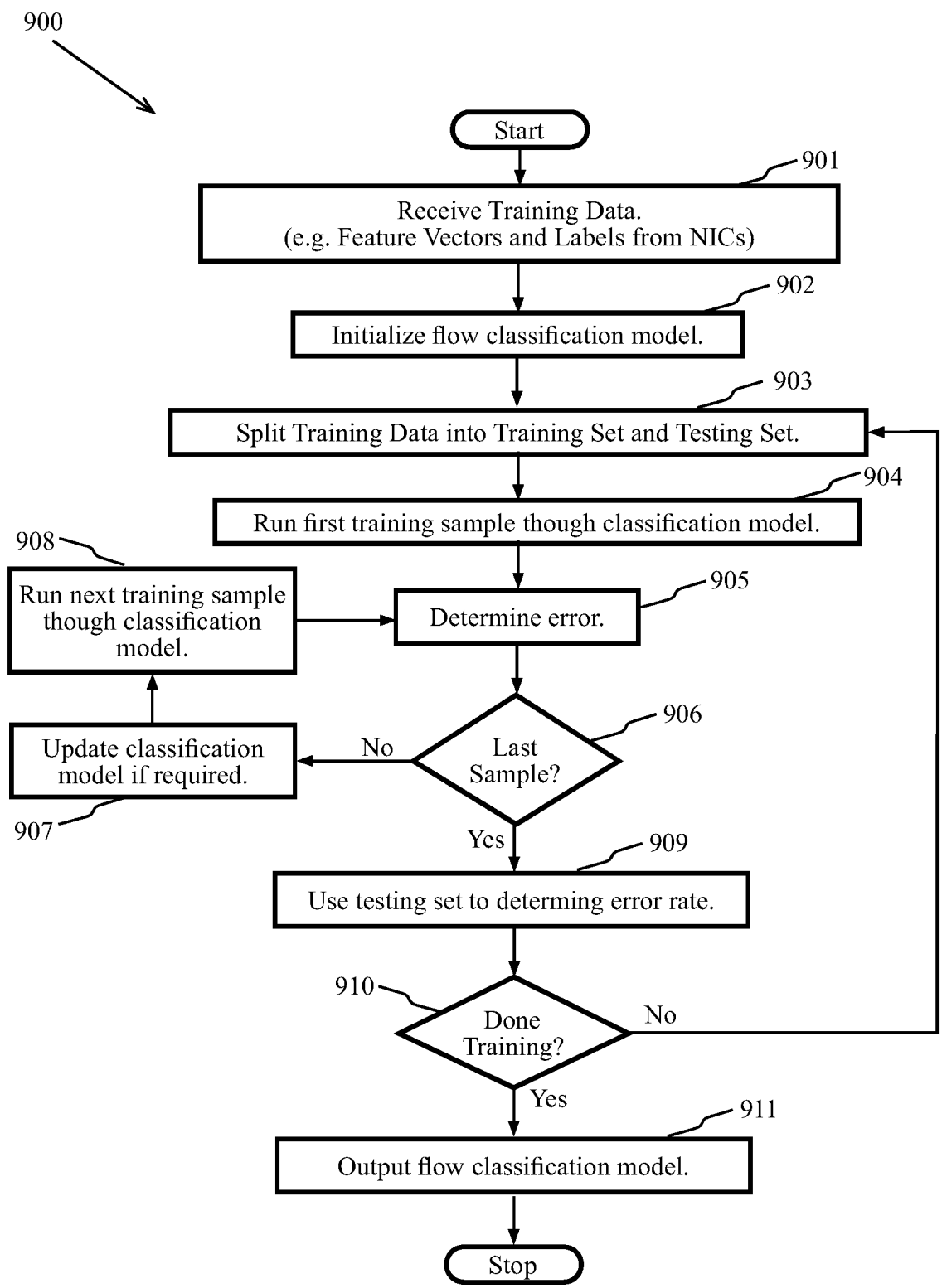
FIG. 9 illustrates a flow chart of an exemplary method for training a classification model using training data received from network appliances according to some aspects.

FIG. 9 illustrates a flow chart of an exemplary method for training a classification model using training data received from network appliances 900 according to some aspects. The method of FIG. 9 is in the supervised machine learning category, can be implemented by the flow training engine 704 of FIG. 7, and can be implemented using one of the widely used machine learning libraries or frameworks. The widely use machine learning libraries and frameworks include TensorFlow, Keras, PyTorch, Apache Spark, Theano, and others. The training data is received 901. As discussed above, the flow training data can be received from one or more network appliances and can include feature vectors associated with labels indicating a class such as long lived flow or short lived flow. A flow classification model is initialized 903, For example, a library call (the machine learning libraries can be utilized via library calls) can initialize a neural network having a specified structure. The training data can be split into a training set and a testing set 903. The training set can be used to train the classification model with the testing set being used later for testing the classification model. The training set can include N training samples numbered 1 through N.

The first training sample of the training set (e.g. training sample 1) is run through the classification model 904. For example, the first training sample can be a feature vector having 10 feature values and the classification model can have 10 inputs. The 10 feature values can be submitted to the 10 classification model inputs. The classification model then produces a prediction. The error can be determined 905 from the prediction and the label associated with the feature vector. If the classification model predicts the correct class then there is no error. If the classification model predicts the wrong class then there is an error. For example, a feature vector can be labeled as in the long lived flow class. If long lived flow is the prediction for that feature vector then there is no error. If the prediction is short lived flow then there is an error. The error can be given a numerical value. The sample can be run through the classification model via a library call.

The classification model is updated if required 906. For example, a linear regression model can be updated via gradient descent and a neural network can be updated via back propagation. As discussed above, the classification model can be initialized via a library call. The classification model can be accomplished via library call.

If the sample is not the last sample in the training set 907 (e.g. not sample N of N samples) then the next sample can be run through the classification model 908 and the process can loop back to determining error 906. Otherwise, the classification model can be tested. The testing set can be used to determined an error rate 909. For example, if the testing set contains 100 feature vectors then all 100 can be run through the classification model to determine a number of wrong predictions and a number of right predictions. If 11 of the 100 feature vectors are misclassified then the error rate is 0.11.

If further training of the classification model is needed 910 then the process can loop back to splitting the training data into a training set and a testing set. Each iteration can have different training and testing sets. If no further training is needed then the classification model can be output 911. The decision as to if training is done 910 can be based on criteria such as: the error rate is less than a desired threshold, the error rate's improvement rate (e.g. previous error rate minus current error rate) is below a threshold, a predetermined time limit has been exceeded (e.g. total CPU time>time limit), or some other criteria. The flow classification model that is output 911 is a major advancement in the art. The uniquely available feature vectors produced by the network appliances can be input to the classification model to predict if a flow is a short lived flow or a long lived flow. A network appliance can use that prediction as guidance for installing long lived flows into a fast data path and for installing short lived flows into a slow data path.

Figure 10:
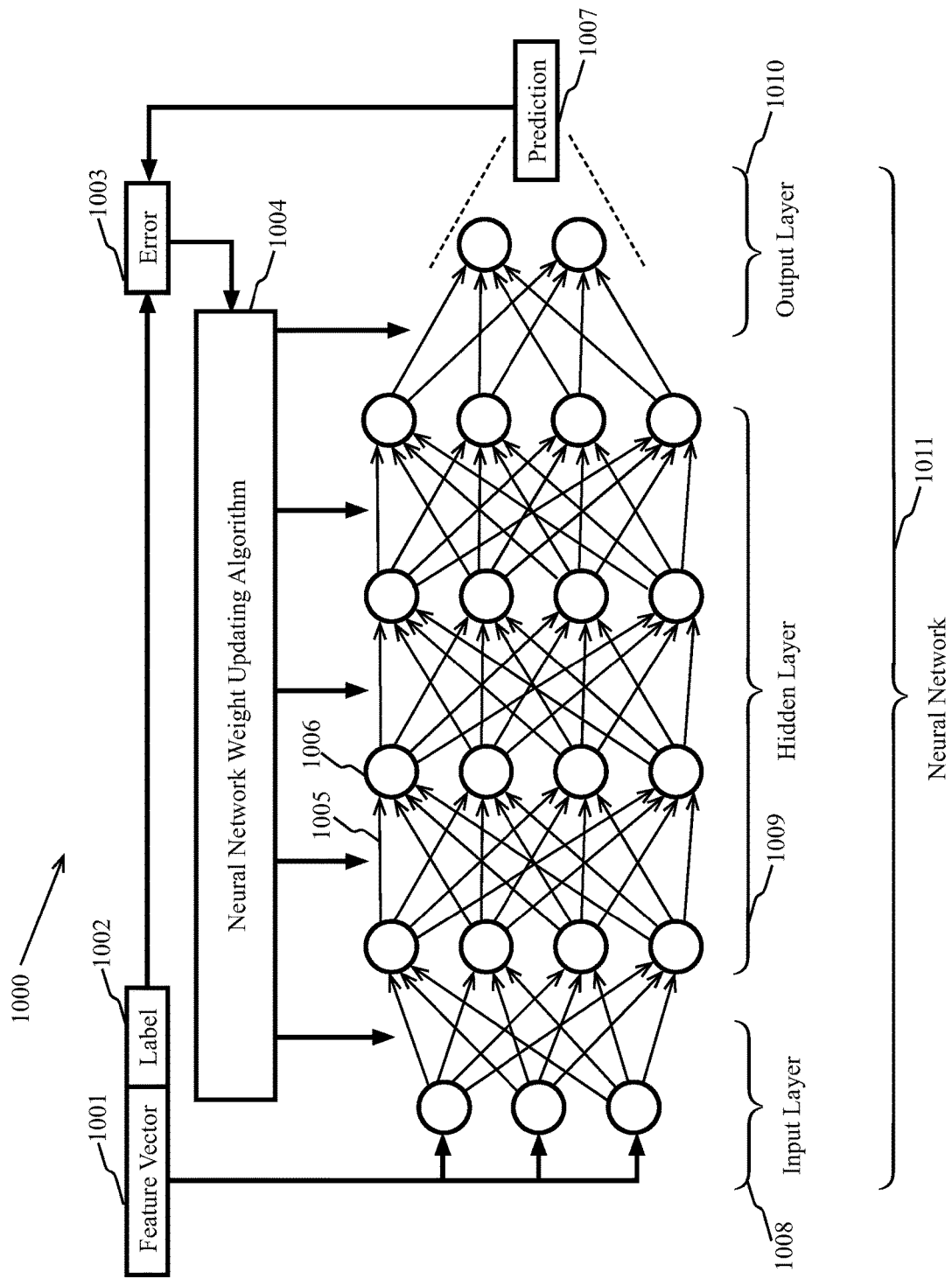
FIG. 10 illustrates a high-level conceptual diagram of a neural network being trained to classify traffic flows according to some aspects.

FIG. 10 illustrates a high-level conceptual diagram 1000 of a neural network 1011 being trained to classify traffic flows according to some aspects. A neural network 1011 has an input layer 1008, hidden layers 1009, and output layers 1010. The illustrated neural network has three input nodes in the input layer 1008 and two output nodes in the output layer 1010. The illustrated neural network has four hidden layers 1009, each having four hidden layer nodes. In practice, even the simplest neural networks have at least two hidden layers and many more hidden nodes than the four per layer shown. Conceptually, the lines 1005 between the nodes 1006 can be considered weights by which an input to the node is multiplied. A node 1006 can sum its inputs and pass the sum through an activation function to produce an output. That output can be an input to the nodes of the next layer. It is understood that the illustrated neural network is intended to provide concepts because, in practice, the embodiments will have many more input nodes (at least one node per feature value in a feature vector), many more hidden layers, many more nodes in each hidden layer, and different arrangements of the weights between the layers. There is no requirement that hidden layers each have the same number of nodes. As an example, one version of the famed "AlphaGo" neural network has thousands of input nodes and fourteen hidden layers that were similarly large. The two output nodes of the conceptual neural network may be reflected in some embodiments because one output node may indicate a short lived flow while the other node indicates a long lived flow.

A feature vector 1001 can be input to the input nodes 1008. The neural network 1011 processes the feature vector 1001 to produce a prediction 1007 (e.g. short lived flow or long lived flow). The error 1003 is determined based on the label 1002 associated with the feature vector 1001 and the prediction 1007 produced by the neural network 1011 for the feature vector 1001. The error 1003 can be provided to a neural network weight updating algorithm 1004. The neural network weight updating algorithm 1004 can adjust the weights 1005 between the nodes 1006. The illustrated neural network is a feed forward neural network because the output of each node is an input to a subsequent layer (layer closer to the output nodes). Back propagation is a commonly used neural network weight updating algorithm for feed forward neural networks. Other neural network topologies and updating algorithms are available in the machine learning libraries and frameworks or in special purpose machine learning hardware.

Figure 11:
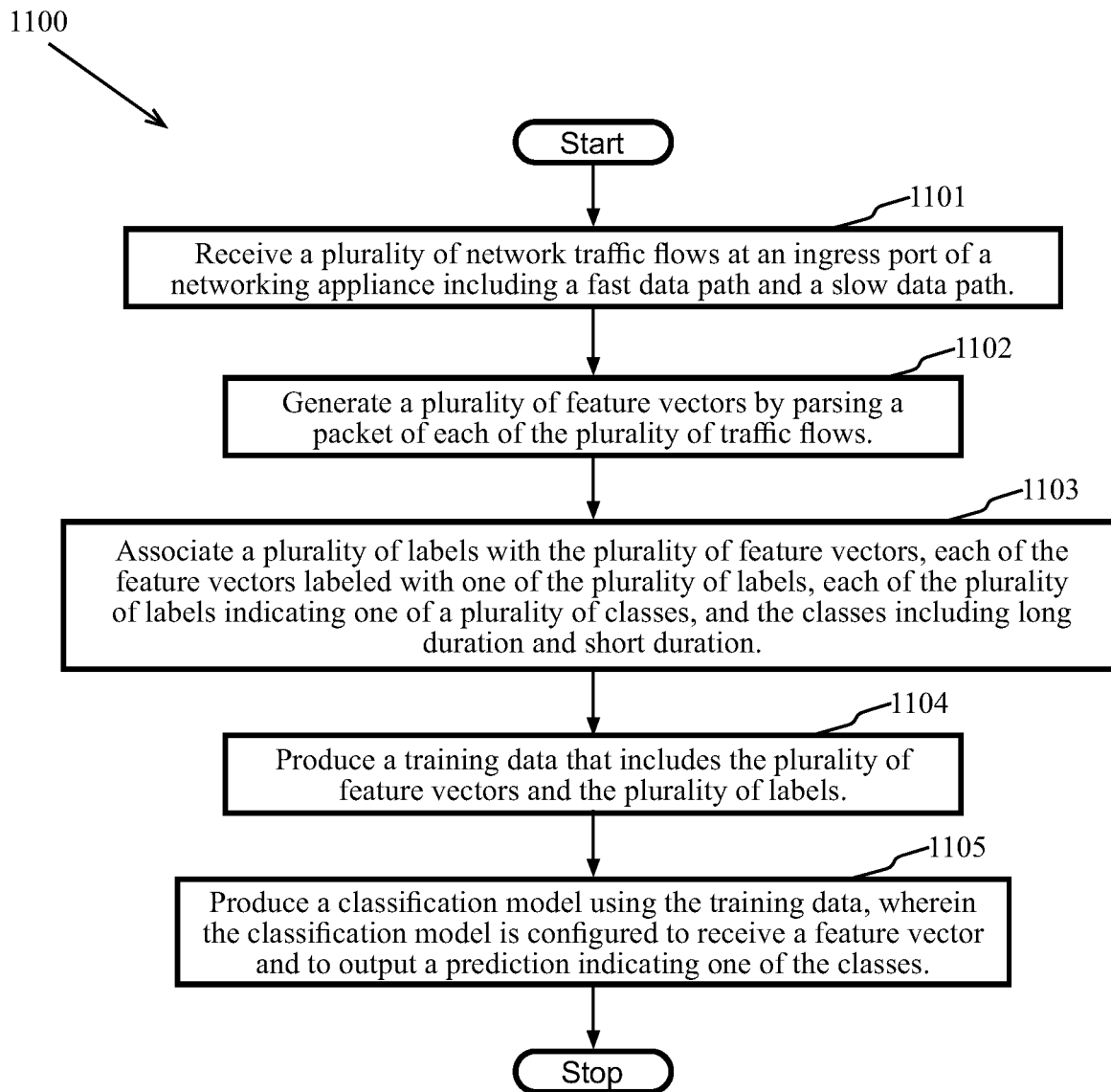
FIG. 11 illustrates a flow chart of an exemplary method for producing a classification model according to some aspects.

FIG. 11 illustrates a flow chart of an exemplary method for producing a classification model 1100 according to some aspects. At block 1101, network traffic flows are received at an ingress unit of a network appliance. For example, FIG. 2 illustrates a network appliance that can receive the network flows at RX MAC 104. At block 1002, a plurality of feature vectors is generated by parsing a packet of each of the plurality of traffic flows. As discussed above, the PHV (e.g. PHV 312) output by a parser (e.g. parser 311 or parser 206) can provide many or all of the field values for a feature vector.

At block 1103, a plurality of feature vectors is generated using the plurality of packet header vectors. A feature vector can be augmented with additional feature values (e.g. number of packets in this network traffic flow since network traffic flow seen time 809) available in the network appliance's flow table. The flow table can contain every field parsed from the packet by the parser as well as other data, such as timestamps, packet counts, status information, etc. generated while processing the traffic flow. The flow table can be held in the network appliance's memory (e.g. DRAM, HBM, etc.) and is not a match table in a match-action unit.

At block 1104, labels are associated with the feature vectors. Each of the feature vectors is labeled with one of the labels. The labels indicate one of a plurality of classes, the classes including long lived flow and short lived flow. As discussed above, a network appliance can determine the duration of a traffic flow. Based on the duration, a traffic flow can be classified as a long lived flow or a short lived flow. The feature vector for a traffic flow can thereby be labeled as a long lived flow or a short lived flow.

At block 1105, training data that includes the plurality of feature vectors and the plurality of labels is produced. The training data can be the feature vectors stored in association with the labels. For example, a network appliance can store 100,000 feature vectors generated from 100,000 traffic flows, each traffic flow classified as a long lived flow or a short lived flow. 100,000 labels, each associated with one of the feature vectors, indicate the class of each of the feature vectors. The training data can include those 100,000 feature vectors stored in association with those 100,000 labels. The training data can contain additional feature vectors stored in association with additional labels. The additional data can be gathered from additional network appliances, from different time periods (e.g. the previous week), etc.

At block 1106, a classification model is produced using the training data. The classification model is configured to produce a prediction based on an input feature vector. The prediction indicates one of the plurality of classes. As discussed above, the classification model can be a neural network that takes a feature vector as input and produces an output predicting if the feature vector is for a long lived flow or a short lived flow.

Figure 12:
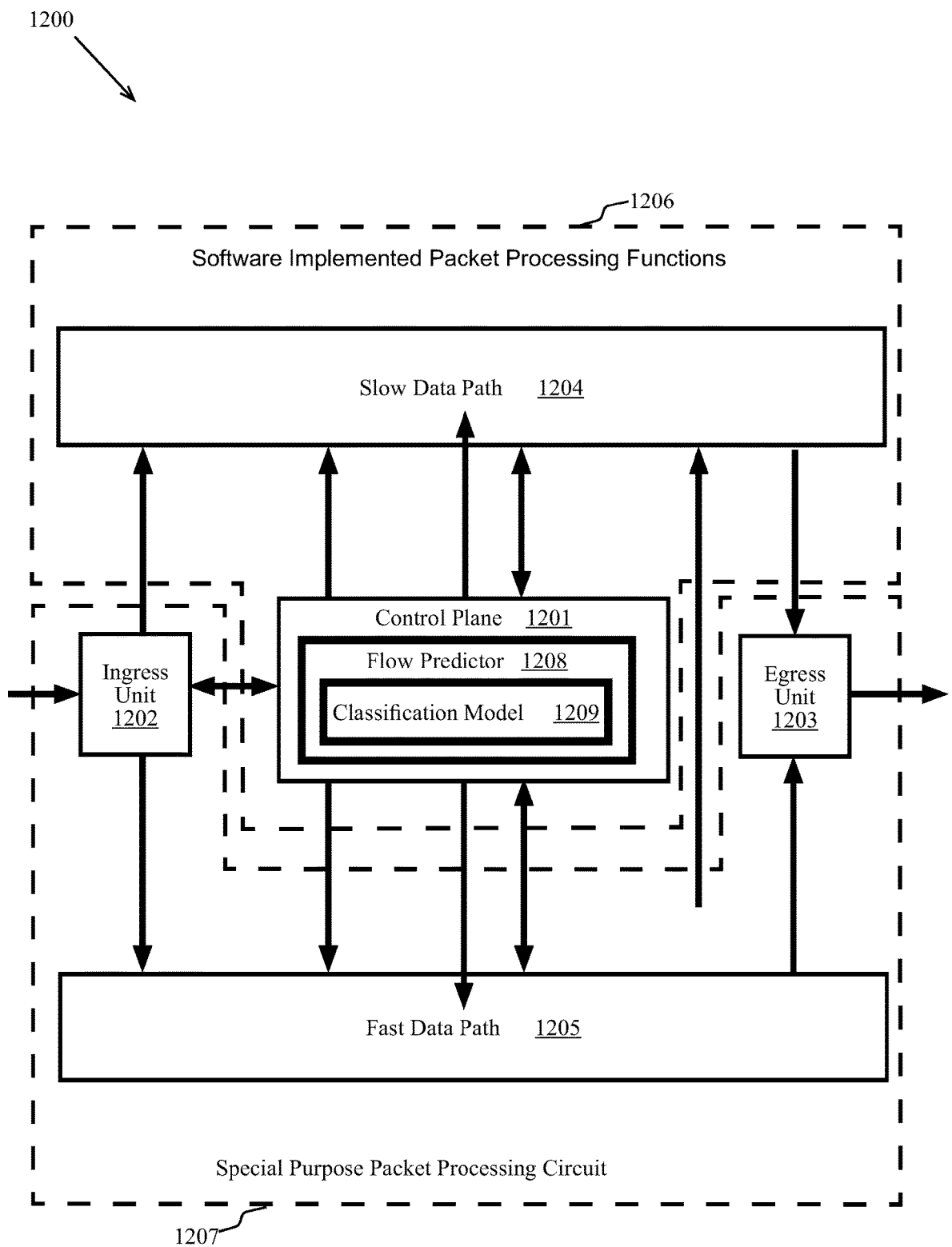
FIG. 12 is a high-level functional block diagram of an example of a network appliance having a flow predictor, a fast data path, and a slow data path according to some aspects.

FIG. 12 is a high-level functional block diagram of an example of a network appliance 1200 having a flow predictor 1208, a fast data path 1205, and a slow data path 1204 according to some aspects. The network appliance of FIG. 12 can be implemented by the NIC 501 of FIG. 5 with some aspects implemented via special purpose packet processing circuitry 1207 and other aspects implemented using software implemented packet processing functions 1206. The network appliance of FIG. 12 can be similar to the network appliance of FIG. 6 with the addition of a flow predictor 1208 in the control plane 1201.

The special purpose packet processing circuitry 1207 can implement an ingress unit 1202, an egress unit 1203, and a fast data path 1205. Referring to FIG. 2, the ingress unit 1202 can include RX MACs and the egress unit can include TX MACs. The fast data path 1205 can be a P4 processing pipeline including an arbiter, a parser, a match-action pipeline, a deparser, and a demux/queue. The function of the elements of the fast data path are discussed above.

Software implemented packet processing functions 1206 can implement the control plane 1201 and the slow data path 1204. The control plane 1201 can include a flow predictor 1208. The control plane 1201 can provide P4 programs to the fast data path 1204 to configure the fast data path to implement particular processing and/or forwarding logic and processing and/or forwarding tables that are populated and managed via P4 table management information that is provided to the fast data path from the control plane. Control traffic (e.g., in the form of packets) may be communicated from the fast data path to the control plane and/or from the control plane to the fast data path. The function of the elements of the fast data path are discussed above.

The slow data path 1204 can be a P4 processing pipeline including an input queue, a match-action pipeline, and an output queue. The control plane 1204 can provide P4 programs to the slow data path to configure the slow data path to implement particular processing and/or forwarding logic and processing and/or forwarding tables that are populated and managed via P4 table management information that is provided to the slow data path from the control plane. Control traffic (e.g., in the form of packets) may be communicated from the slow data path to the control plane and/or from the control plane to the slow data path.

A classification model 1209 can be installed in the flow predictor 1208. As discussed above, a classification model can be produced by a flow training engine 704 or a method for training a classification model using training data received from network appliances 900. The machine learning libraries and frameworks provide for running a classification model that has been trained. As such, the control plane can include a flow predictor 1208 and a classification model can be installed in the flow predictor. The classification model can be a neural network that takes a feature vector as input and produces an output predicting if the feature vector is for a long lived flow or a short lived flow.

The ingress unit 1202 can receive the first packet for a new traffic flow and pass it to the fast data path where it is parsed to produce a PHV. The fast data path can generate a table miss because the packet is the first packet of a new flow and the new flow has not been installed in the fast data path. The PHV can therefore be sent to the control plane 601. The control plane can generate a feature vector using the PHV, which may include metadata, and other data that may be available in, for example, the flow table. The feature vector can be input into the flow predictor 1208 such that the classification model 1209 predicts that the new traffic flow is a long lived flow or predicts that the new traffic flow is a short lived flow.

If the classification model predicts that the new traffic flow is a long lived flow then the control plane 1201 can install the new traffic flow in the fast data path 1205. Installing a traffic flow in the fast data path can include entering keys and actions into the match action tables of the fast data path. The keys are based on the PHV. Once the new traffic flow is installed, the fast data path can process the first packet and the following packets of the new traffic flow. The following packets do not cause a table miss in the fast data path after the new traffic flow is installed in the fast data path.

If the classification model predicts that the new traffic flow is a short lived flow then the control plane 1201 can install the new traffic flow in the slow data path 1204. Installing the new traffic flow in the slow data path can include entering keys and actions into the match action tables of the slow data path. The keys are based on the PHV. Once the new traffic flow is installed in the slow data path, the slow data path can process all the packets in the new traffic flow. In this case, every packet for the new traffic flow can cause a table miss in the fast data path 1205. The new traffic flow packets can be sent from the fast data path to the slow data path via the control plane and placed on the slow data path input queue. The match-action pipeline of the slow data path 1204 processes the new traffic flow packets and places them on the slow data path's output queue. From the output queue, the new traffic flow packets can pass back to the fast data path 1204 via the control plane 1201 where they can be processed by the deparser 624, demux/queue 625, and egress unit 603.

Figure 13:
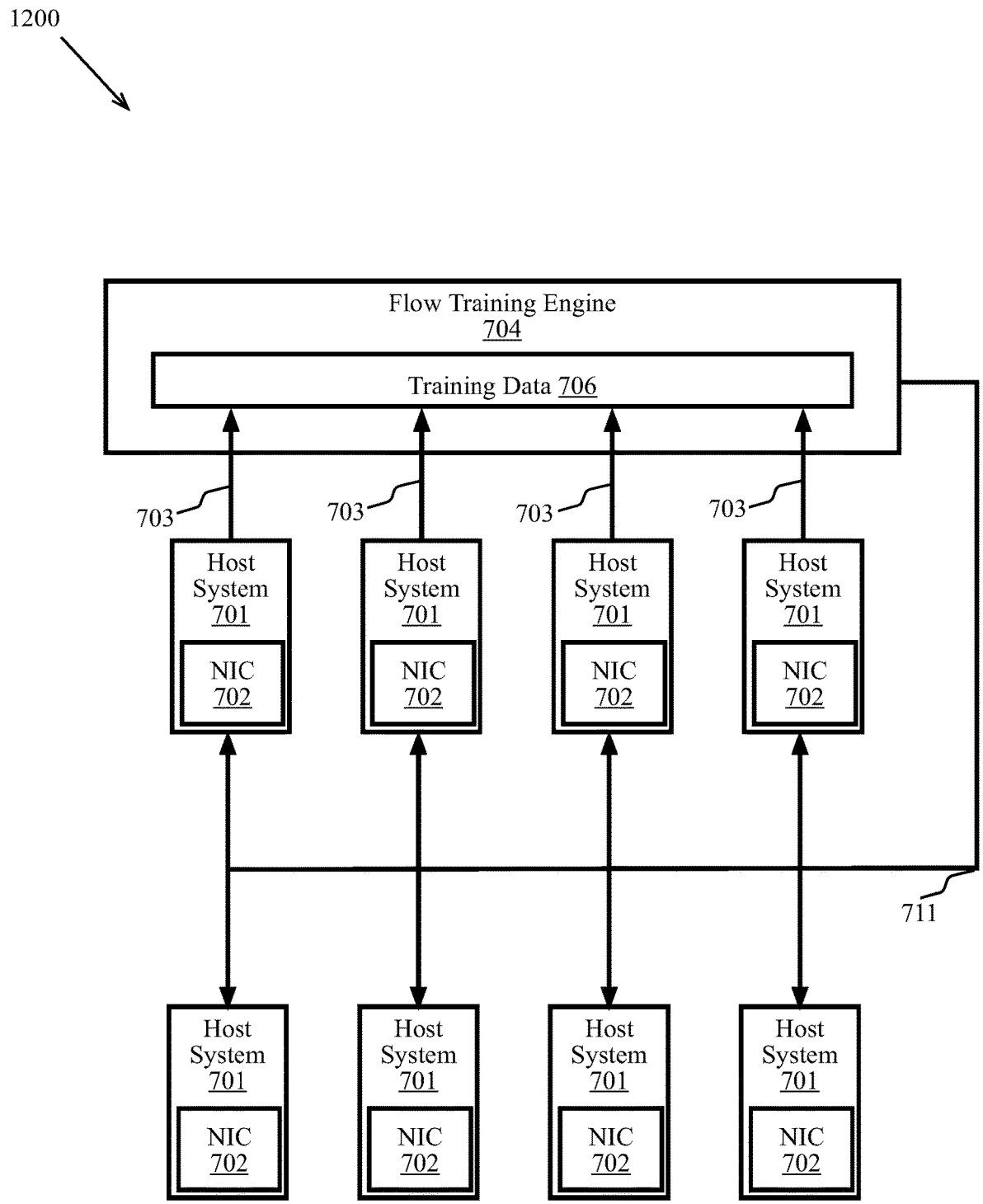
FIG. 13 is a high-level functional block diagram of hosts providing training data to a flow training engine and receiving classification models from the flow training engine according to some aspects.

FIG. 13 is a high-level functional block diagram of network appliances providing training data to a flow training engine and receiving classification models from the flow training engine 1300 according to some aspects. Host systems 701 include NICs 702 configured as network appliances producing network appliance training data 703. As discussed above, a flow training engine can receive the network appliance's training data 703. The flow training engine 704 can be configured to store training data 706. Training data 706 can be equivalent to the network appliance training data 703 produced by one NIC/host or can be an aggregation of the data produced by a set of network appliances. The flow training engine 704 can use the training data 706 to produce a classification model 711. All or some of the NICs can receive the classification model and can install the classification model in flow predictors 1208. As such, all the network appliances, even those that do not collect training data, can benefit from using the classification model to predict of a traffic flow is a long lived flow or a short lived flow. The flow training engine can collect training data and periodically produce classification models. For example, the network appliance training data 703 can be sent to the flow training engine daily, weekly, or at some other interval. The flow training engine can generate a new classification model periodically such as daily, weekly, or at some other interval. The NICs 702 and any other network appliance configured with a flow predictor can receive and install the new classification models as they are made available.

Figure 14:
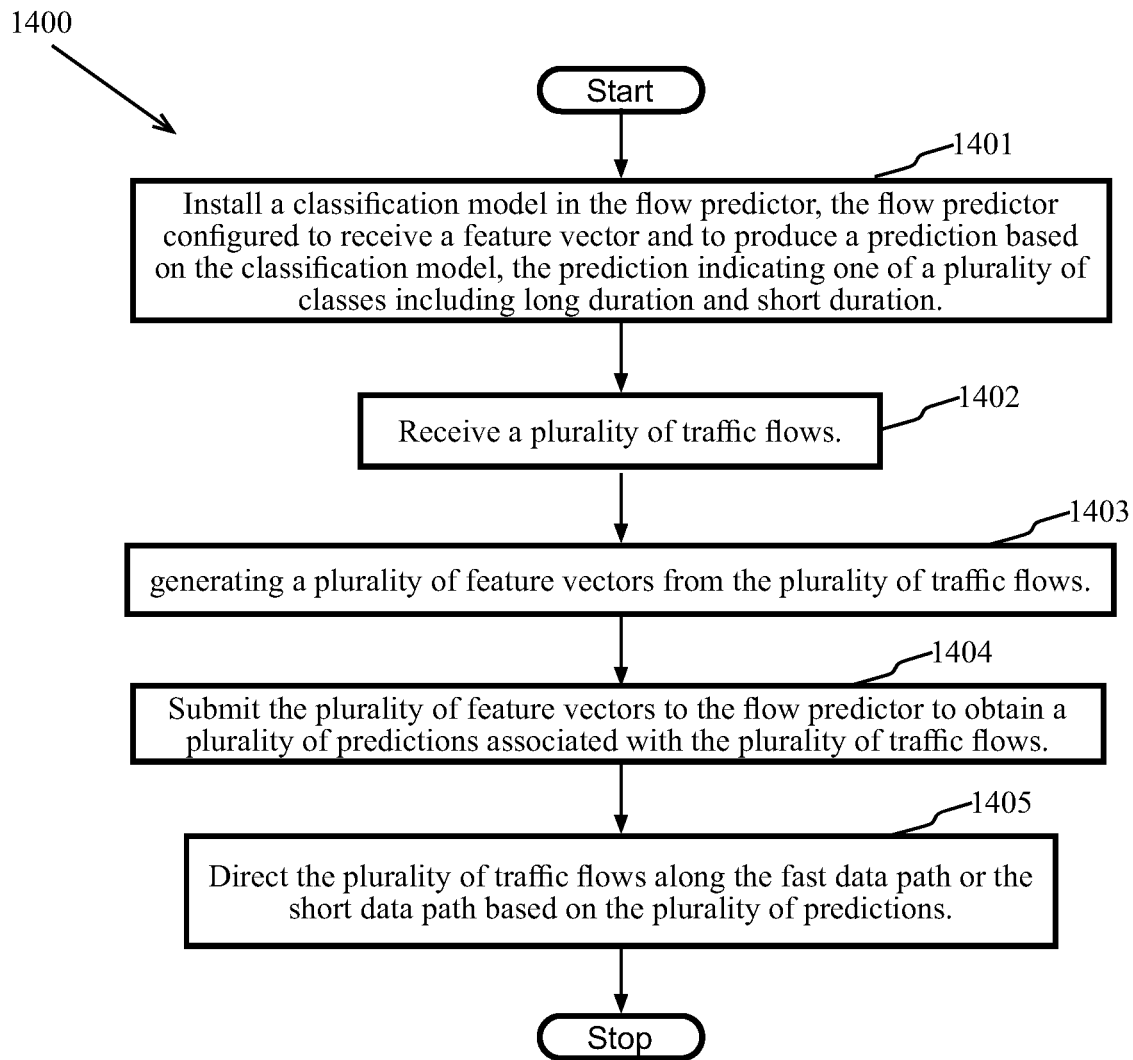
FIG. 14 illustrates a flow chart of an exemplary method for directing traffic flows along a fast data path and a slow data path based on predictions from a classification model according to some aspects.

FIG. 14 illustrates a flow chart of an exemplary method for directing traffic flows along a fast data path and a slow data path based on predictions from a classification model 1400 according to some aspects. The method of FIG. 14 can be implemented by the network appliances and NICs of FIGS. 5, 13 and 14. At block 1401, a classification model is installed in a flow predictor. The flow predictor is configured to receive a feature vector and to produce a prediction based on the installed classification model. The prediction indicates one of a plurality of classes including long lived flow and short lived flow.

At block 1402, traffic flows are received and at block 1403 feature vectors are generated from the traffic flows. As discussed above, a RX MAC can receive the first packet of a traffic flow and can send that first packet to an arbiter. The arbiter can send the packet to a parser that generates a PHV from the first packet. A feature vector can be produced from the PHV. The PHV may contain metadata such as source MAC address, destination MAC address, and time stamps. The feature vector may be supplemented with data outside the PHV that is generated by the network appliance.

At block 1404, the feature vectors are submitted to the flow predictor to obtain predictions associated with the plurality of traffic flows. The predictions indicate which of the traffic flows are predicted to be long lived flows and which of the traffic flows are predicted to be short lived flows. As discussed above, flow predictors 1208 in network appliances 1200 can produce a prediction for some or all of the traffic flows.

At block 1405, the traffic flows are directed along a fast data path or a slow data path based on the predictions. As discussed above, network appliances can have fast data paths and slow data paths. A network appliance's throughput is increased, and its power efficiency (bps/Watt) is increased when the long lived flows are processed by the fast data path. The number of traffic flows installed in the fast data path is limited by the size of the lookup tables in fast data path match-action units. As such, short lived flows installed in the fast data path can prevent long lived flows from being installed in the fast data path. Those long lived flows must either wait until they can be installed in the fast data path or must be processed by the slow data path. By predicting which flows are long lived and which are short lived, the short lived flows can be installed in the slow data path and the long lived flows can be installed in the fast data path.

Aspects described above can be ultimately implemented in a network appliance that includes physical circuits that implement digital data processing, storage, and communications. The network appliance can include processing circuits, ROM, RAM, CAM, and at least one interface (interface(s)). In an embodiment, the CPU cores described above are implemented in processing circuits and memory that is integrated into the same integrated circuit (IC) device as ASIC circuits and memory that are used to implement the programmable packet processing pipeline. For example, the CPU cores and ASIC circuits are fabricated on the same semiconductor substrate to form a System-on-Chip (SoC). In an embodiment, the network appliance may be embodied as a single IC device (e.g., fabricated on a single substrate) or the network appliance may be embodied as a system that includes multiple IC devices connected by, for example, a printed circuit board (PCB). In an embodiment, the interfaces may include network interfaces (e.g., Ethernet interfaces and/or InfiniBand interfaces) and/or PCI Express (PCIe) interfaces. The interfaces may also include other management and control interfaces such as I2C, general purpose I/Os, USB, UART, SPI, and eMMC.

As used herein the terms "packet" and "frame" may be used interchangeably to refer to a protocol data unit (PDU) that includes a header portion and a payload portion and that is communicated via a network protocol or protocols. In some embodiments, a PDU may be referred to as a "frame" in the context of Layer 2 (the data link layer) and as a "packet" in the context of Layer 3 (the network layer). For reference, according to the P4 specification: a network packet is a formatted unit of data carried by a packet-switched network; a packet header is formatted data at the beginning of a packet in which a given packet may contain a sequence of packet headers representing different network protocols; a packet payload is packet data that follows the packet headers; a packet-processing system is a data-processing system designed for processing network packets, which, in general, implement control plane and data plane algorithms; and a target is a packet-processing system capable of executing a P4 program.

Although the techniques are described herein in terms of processing packetized digital data as is common in digital communications networks, the techniques described herein are also applicable to processing digital data that is not packetized for digital communication using a network protocol. For example, the techniques described herein may be applicable to the encryption of data, redundant array of independent disks (RAID) processing, offload services, local storage operations, and/or segmentation operations. Although the techniques are described herein in terms of the P4 domain-specific language, the techniques may be applicable to other domain-specific languages that utilize a programmable data processing pipeline at the data plane.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

The invention claimed is:

1. A method comprising:
receiving, by a network appliance, a plurality of packets of a plurality of traffic flows;
parsing, by a parser in a data path implemented by a special purpose packet processing circuitry in the network appliance, a plurality of packet headers of the packets to produce a plurality of packet header vectors (PHVs);
using the PHVs to process the packets in the data path before transmitting the packets to a plurality of destination IP addresses that are in the PHVs;
storing, in a flow table of the network appliance, a flow creation time of the traffic flows or a packet count of the traffic flows;
using the PHVs, by the network appliance, to produce a plurality of feature vectors for the traffic flows;
associating a plurality of labels with the feature vectors, each of the plurality of feature vectors labeled with one of the labels;
producing a training data that includes the feature vectors stored in association with the labels; and
producing a classification model using the training data, wherein the classification model is configured to produce a prediction based on an input feature vector, the prediction indicating one of the labels,
wherein
the labels are associated with the feature vectors based on the flow creation time, a duration determined using the flow creation time, or the packet count of the traffic flows.

2. The method of claim 1, wherein producing the classification model comprises:
initializing the classification model;
training the classification model by iteratively inputting the plurality of feature vectors to obtain a plurality of predictions; and
modifying the classification model based on the plurality of predictions and the plurality of labels to cause the classification model to decrease an error rate.

3. The method of claim 1, wherein:
the data path implemented by the special purpose packet processing circuitry in the network appliance includes the parser, a match action pipeline, and a deparser;
the match action pipeline includes a plurality of match action units;
a one of the PHVs is produced by the parser;
the one of the PHVs is passed through the match action units in series;
the deparser receives the one of the PHVs from the match action pipeline; and
the deparser uses the one of the PHVs to generate a packet header for the one of the packets.

4. The method of claim 1, wherein the special purpose packet processing circuitry is configured to implement a match action pipeline that process the packets before the packets are transmitted to the destination IP addresses that are in the PHVs.

5. The method of claim 4, wherein:
a network interface card (NIC) includes the special purpose packet processing circuitry;
the NIC includes a flow predictor and a second data path that is slower than the data path;
the flow predictor uses the classification model to produce a plurality of predictions; and
the NIC uses the predictions to direct network traffic flows to the data path or to the second data path.

6. The method of claim 1, wherein the training data further includes feature vectors received from a plurality of network appliances that includes the network appliance.

7. The method of claim 6, wherein each of the network appliances includes the special purpose packet processing circuitry that implements the data path of each of the plurality of network appliances.

8. The method of claim 1, wherein the classification model is a neural network having at least two hidden layers.

9. The method of claim 1, wherein the labels are associated with the feature vectors based on the packet count of the traffic flows.

10. The method of claim 1, wherein the labels are associated with the feature vectors based on the duration of the traffic flows.

11. The method of claim 1, wherein associating the labels with the feature vectors includes:
  initially labeling, by the network appliance, each of the plurality of traffic flows as a short lived flow; and
  relabeling, by the network appliance, each of the plurality of traffic flows that exceeds a threshold duration as a long lived flow.

12. The method of claim 1, wherein:
  the network appliance stores the feature vectors in association with the labels as a plurality of training batches; and
  the network appliance transmits the training batches to a flow training engine configured to produce the classification model.

13. The method of claim 1, wherein:
  the network appliance includes a second data path that is slower than the data path, and a flow predictor;
  the network appliance is configured to install the classification model in the flow predictor;
  the network appliance is configured to produce a plurality of predictions by inputting the plurality of feature vectors into the flow predictor; and
  the network appliance is configured to direct the plurality of traffic flows along the data path or the second data path based on the plurality of predictions.

14. A network appliance comprising:
  an ingress unit that receives a plurality of packets of a plurality of traffic flows;
  special purpose packet processing circuitry that implements a parser that parses the packets to produce a plurality of PHVs;
  a plurality of match action units that are implemented by the special purpose packet processing circuitry that use the PHVs to process the packets;
  a flow table that stores a flow creation time of the traffic flows or a packet count of the traffic flows; and
  an egress unit that transmits the packets to a plurality of destination IP addresses that are in the PHVs after the packets are processed by the match action units,
  wherein
    the network appliance produces a plurality of feature vectors for the traffic flows from the PHVs,
    the network appliance associates a plurality of labels with the feature vectors,
    the labels are associated with the feature vectors based on the flow creation time, a duration determined using the flow creation time, or the packet count,
    the network appliance produces a training data that includes the feature vectors stored in association with the labels, and
    the network appliance submits the training data to a flow training engine configured to produce a classification model using the training data, wherein the classification model is configured to produce a prediction based on an input feature vector, the prediction indicating one of the plurality of labels.

15. The network appliance of claim 14, further comprising the flow training engine, the flow training engine configured to:
  initialize the classification model;
  train the classification model by iteratively inputting the plurality of feature vectors to obtain a plurality of predictions; and
  modify the classification model based on the plurality of predictions and the plurality of labels to cause the classification model to decrease an error rate.

16. The network appliance of claim 14, wherein;
  the special purpose packet processing circuitry implements a deparser;
  a one of the PHVs is passed through the match action units in series;
  the deparser receives the one of the PHVs from the match action units; and
  the deparser uses the one of the PHVs to generate a packet header for one of the packets.

17. The network appliance of claim 14, wherein the classification model is a neural network having at least two hidden layers.

18. The network appliance of claim 14, wherein the labels are associated with the feature vectors based on the duration of the traffic flows.

* * * * *